(12) United States Patent
Abe et al.

(10) Patent No.: US 7,781,930 B2
(45) Date of Patent: Aug. 24, 2010

(54) ACCESSORY DRIVE SYSTEM WITH RD MOTOR

(75) Inventors: Noriyuki Abe, Saitama-ken (JP); Shigemitsu Akutsu, Saitama-ken (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 367 days.

(21) Appl. No.: 11/882,739

(22) Filed: Aug. 3, 2007

(65) Prior Publication Data

US 2008/0211335 A1  Sep. 4, 2008

(30) Foreign Application Priority Data

Aug. 9, 2006 (JP) ............................. 2006-217142

(51) Int. Cl.
*H02K 15/00* (2006.01)
(52) U.S. Cl. ...................................... 310/103; 310/112
(58) Field of Classification Search ................. 310/103, 310/112, 114
See application file for complete search history.

(56) References Cited

U.S. PATENT DOCUMENTS

| | | | | |
|---|---|---|---|---|
| 5,675,203 A | * | 10/1997 | Schulze et al. | 310/113 |
| 5,744,895 A | * | 4/1998 | Seguchi et al. | 310/266 |
| 6,380,653 B1 | * | 4/2002 | Seguchi | 310/112 |
| 6,472,845 B2 | * | 10/2002 | Minagawa et al. | 318/801 |
| 6,501,190 B1 | | 12/2002 | Seguchi et al. | |

FOREIGN PATENT DOCUMENTS

| | | |
|---|---|---|
| JP | 08-037762 | 2/1996 |
| JP | 11-164535 | 6/1999 |
| JP | 2000-179374 | 6/2000 |
| JP | 2004-232560 | 8/2004 |

OTHER PUBLICATIONS

International Search Report, PCT/JP2007/065243, filed Aug. 9, 2006.
Official Communication issued in the corresponding European Application No. 07791917.3, dated Aug. 3, 2009.

* cited by examiner

*Primary Examiner*—Nguyen N Hanh
(74) *Attorney, Agent, or Firm*—Squire, Sanders & Dempsey, LLP

(57) ABSTRACT

An accessory drive system includes a stator, a first rotor, and a second rotor, which respectively include armatures, permanent magnets, and first and second cores. One of the first and second rotors is connected to an accessory, and the other to an internal combustion engine. When the polarity of a first armature magnetic pole is different from the polarity of a first magnetic pole of an opposed permanent magnet, the polarity of a second armature magnetic pole becomes the same as the polarity of a second magnetic pole of the opposed permanent magnet. When each first core is between the first magnetic pole and the first armature magnetic pole, each second core is between a pair of the second armature magnetic poles circumferentially adjacent to each other, and between a pair of the second magnetic poles circumferentially adjacent to each other.

6 Claims, 17 Drawing Sheets

FIG. 5
(a)
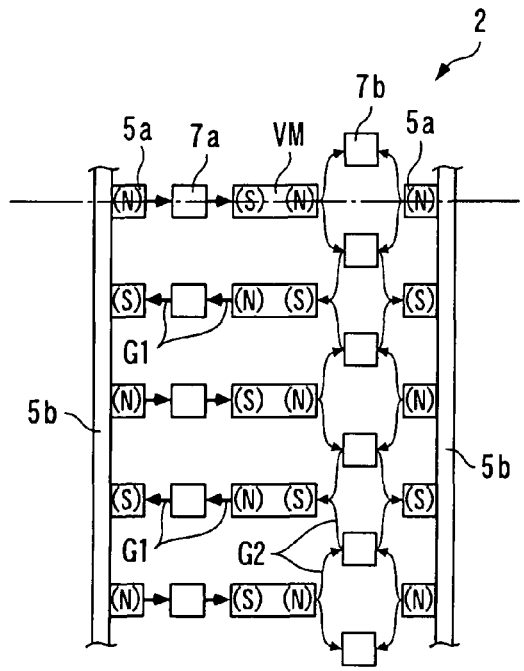
(b)
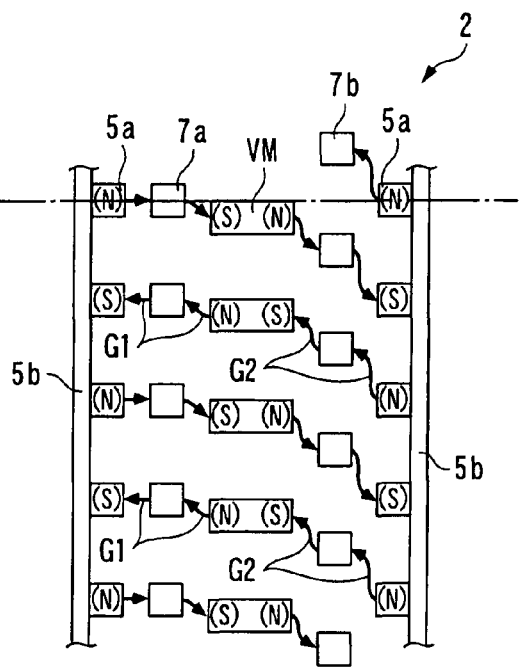
(c)
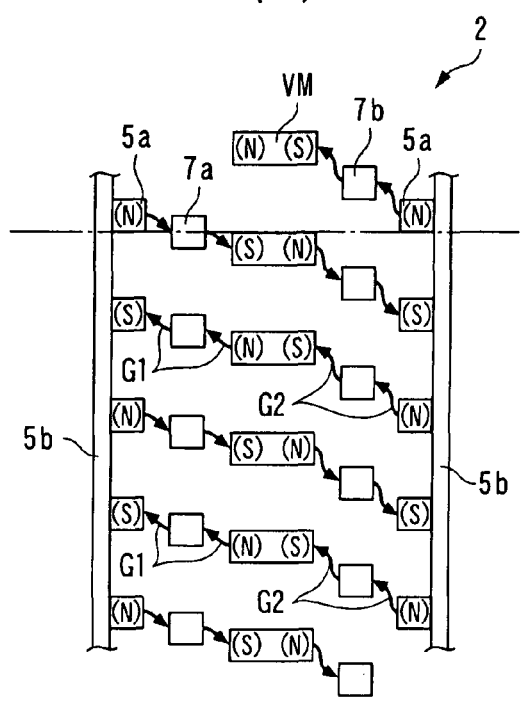
(d)
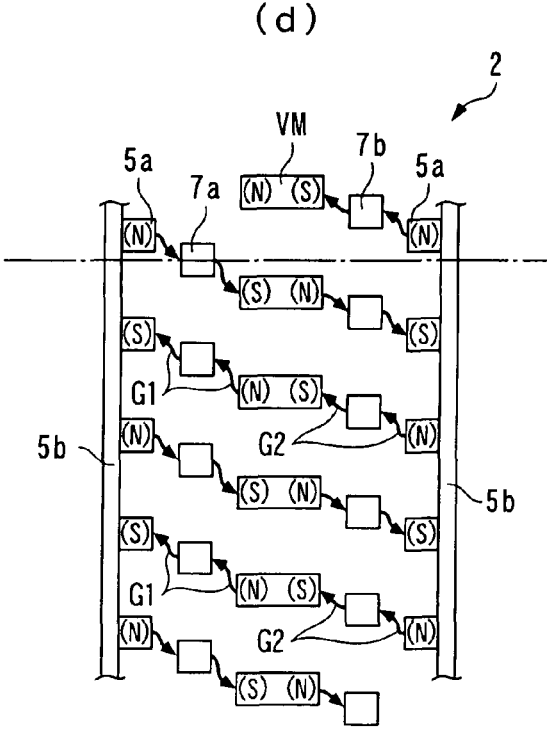

FIG. 6
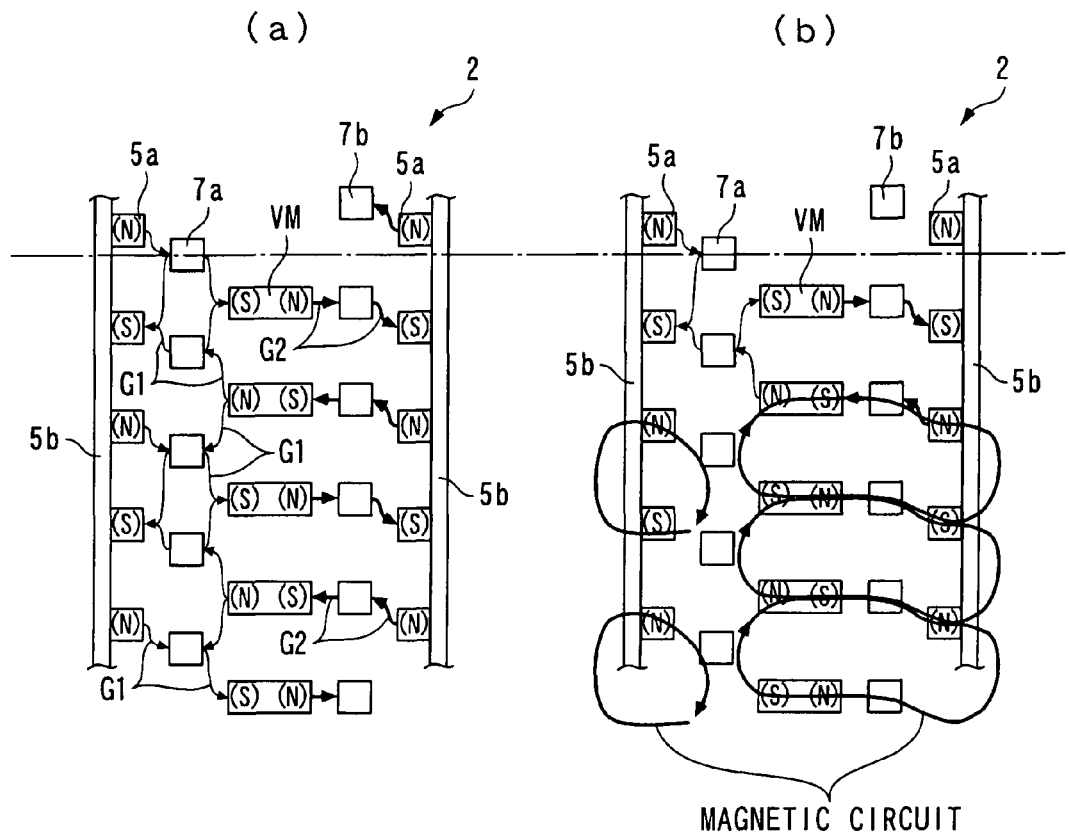
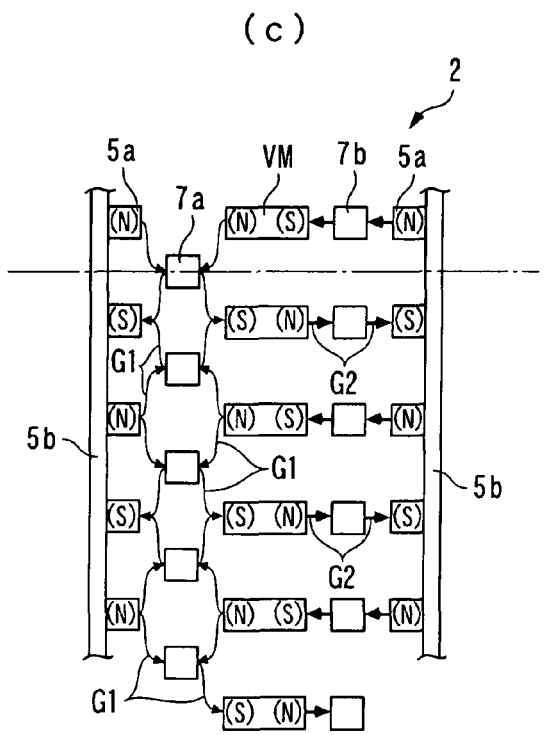

FIG. 7
(a)
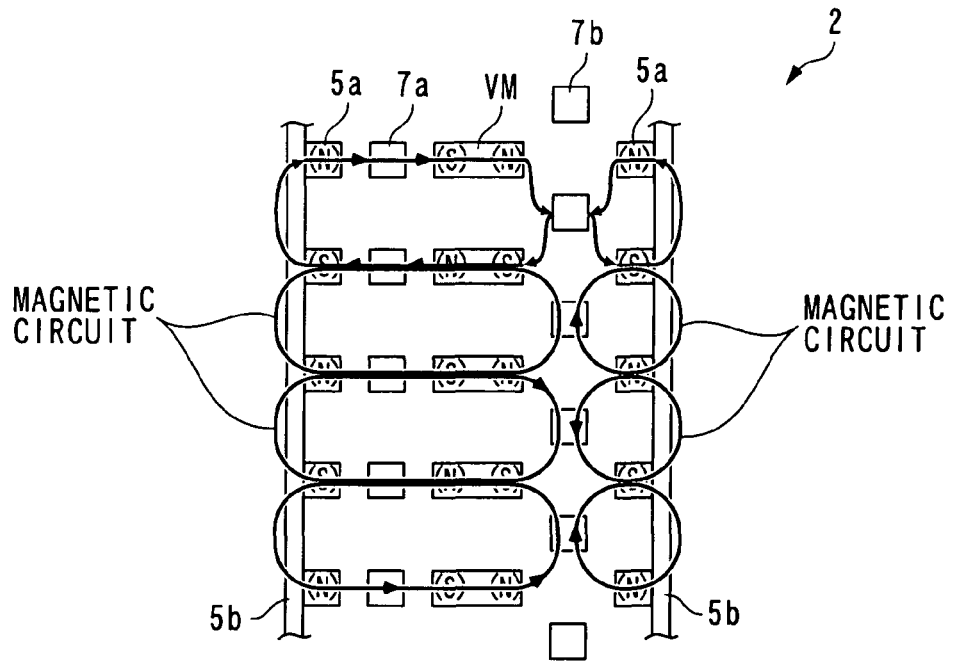
(b)
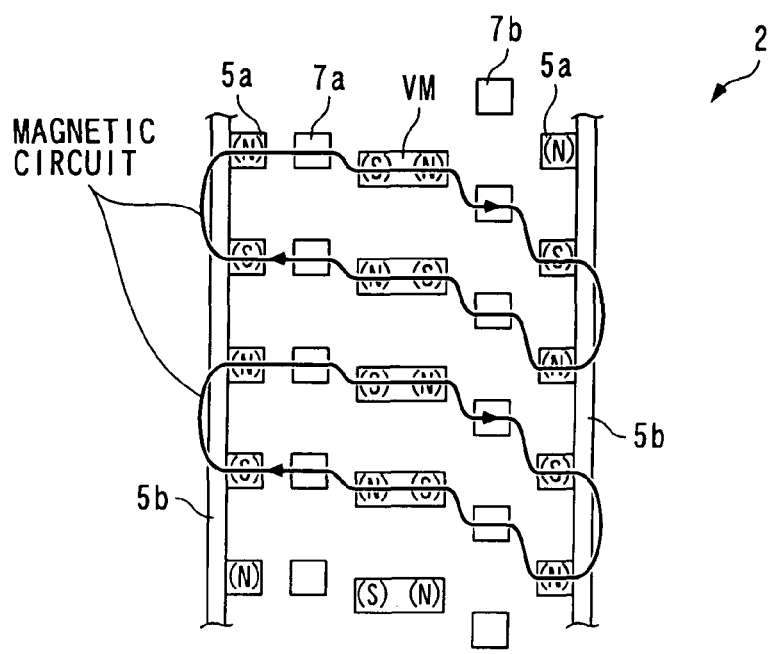

FIG. 8
(a)
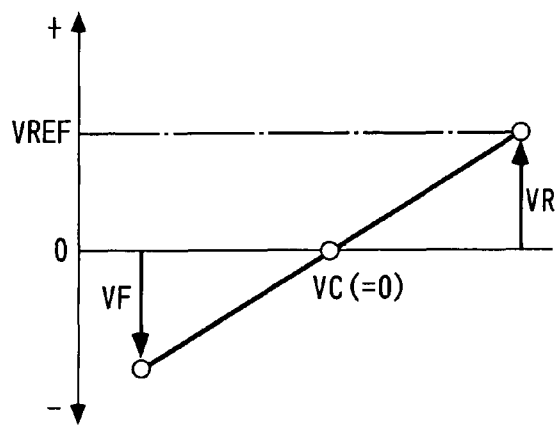
(b)
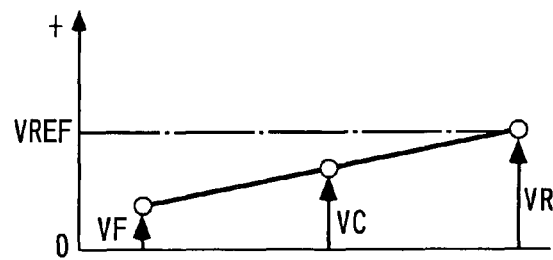
(c)
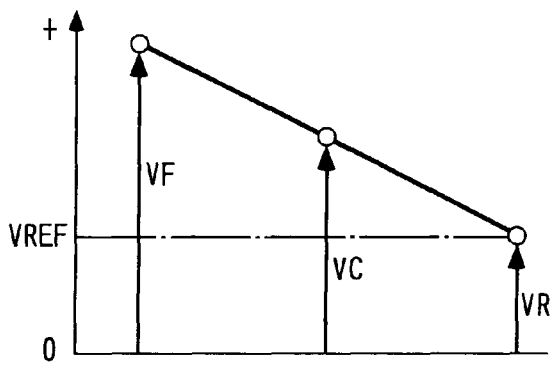
(d)
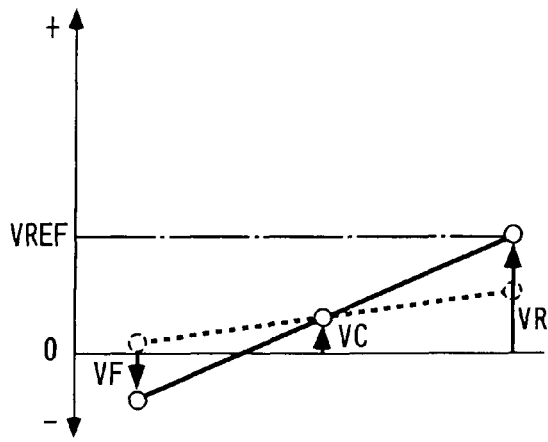

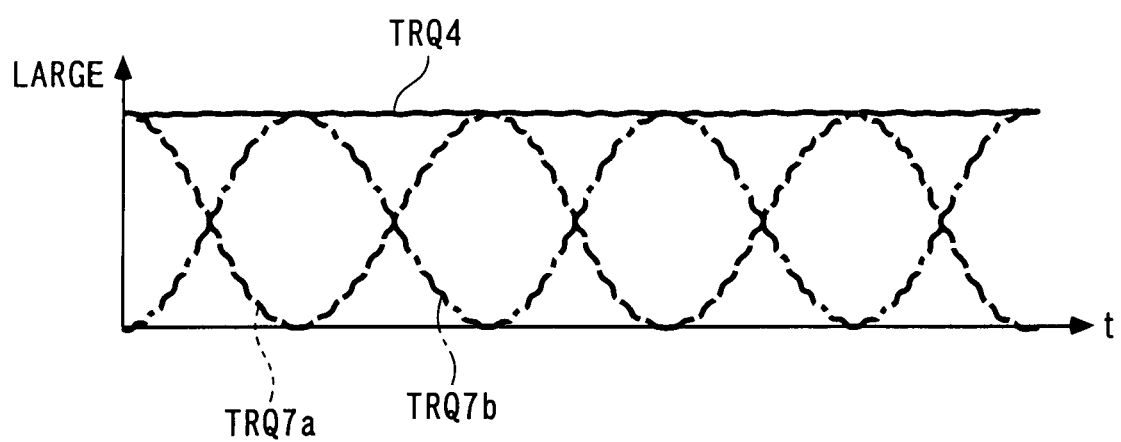
F I G. 1 4

FIG. 15
(a)
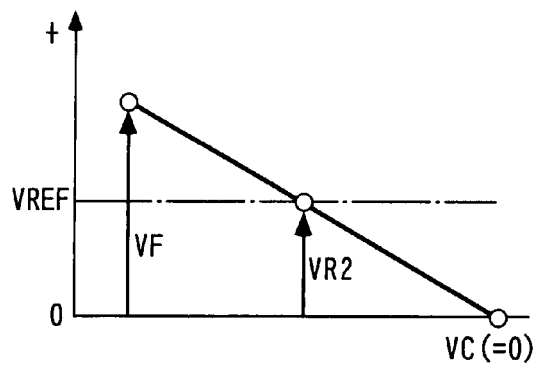
(b)
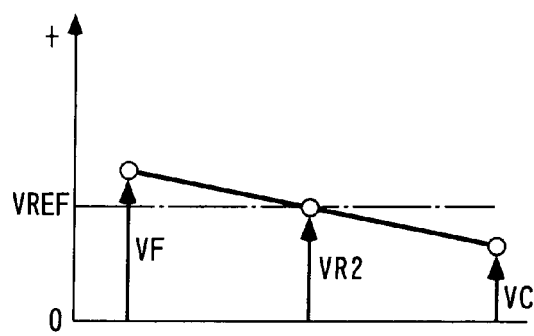
(c)
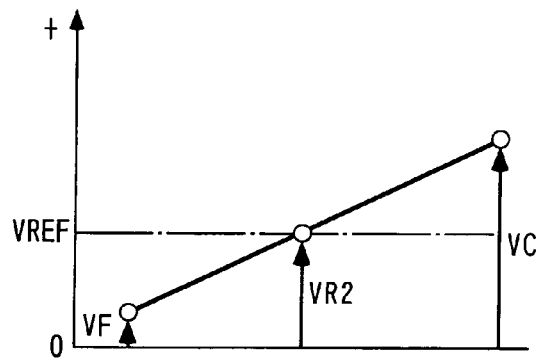
(d)
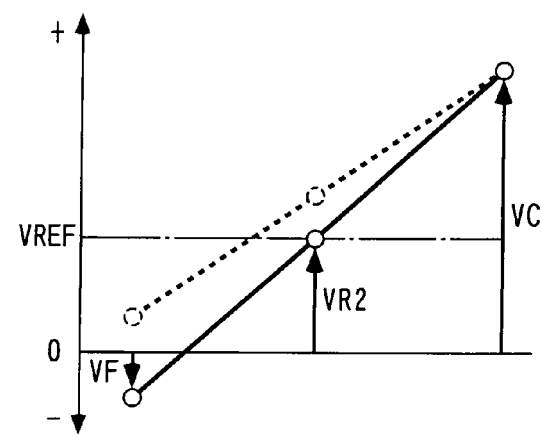

ACCESSORY DRIVE SYSTEM WITH RD MOTOR

FIELD OF THE INVENTION

The present invention relates to an accessory drive system connected to an internal combustion engine, for driving an accessory.

BACKGROUND ART

Conventionally, as an accessory drive system of this kind, one disclosed in Patent Literature 1 is known. This accessory drive system drives an accessory, such as a compressor for an air conditioner installed on a vehicle, using an internal combustion engine (hereinafter simply referred to as "the engine") and an electric motor as drive sources, and is provided with the electric motor, first to third pulleys, and a clutch. The first pulley is provided on an output shaft of the above electric motor, the second pulley on a crankshaft of the engine, the third pulley on an input shaft of the accessory. Further, belts extend around the first to third pulleys, whereby the electric motor, the engine, and the accessory are connected to each other. A clutch is provided between the crankshaft and the second pulley, for connecting and disconnecting between the engine, the electric motor, and the accessory.

In the accessory drive system configured as above, during operation of the engine, the clutch connects the crankshaft and the accessory, whereby the accessory is driven by the engine. On the other hand, during stoppage of the engine, the clutch holds the crankshaft and the accessory in a disconnected state, and the accessory is driven by rotating the electric motor.

As described above, in the conventional accessory drive system, since the engine and the electric motor are used as drive sources of the accessory during operation and stoppage of the engine, the engine, the electric motor, and the accessory are connected to each other. Further, to prevent the friction of the engine from acting as load on the electric motor during stoppage of the engine, the clutch is provided for disconnecting between the engine, the electric motor, and the accessory only during stoppage of the engine, and is indispensable in the conventional accessory drive system. This brings about an increase in the size of the system, and an increase in the manufacturing costs. Further, when the engine is stopped or started during driving of the accessory, it is impossible to avoid generation of clutch noises, which results in degraded marketability thereof. Furthermore, since there is a limit to speed reduction by the pulley connecting between the engine and the accessory, the rotational speed of the input shaft of the accessory becomes high during high-speed operation of the engine, and to withstand the increased rotational speed of the input shaft, it is inevitable to increase the size of the accessory.

The present invention has been made to provide a solution to the above-described problems, and an object thereof is to provide an accessory drive system which is capable of achieving downsizing of the system, reduction of manufacturing costs thereof, and enhancement of marketability thereof.

[Patent Literature 1] Japanese Laid-Open Patent Publication (Kokai) No. 2000-179374.

DISCLOSURE OF THE INVENTION

Means for Solving the Problems

To attain the object, the invention as claimed in claim 1 provides an accessory drive system 1, 30 connected to an internal combustion engine 21, for driving an accessory 22, 23, comprising a stator 6 including a first armature row formed by a plurality of first armatures (armatures 6a in the embodiment (the same applies hereinafter in this section)) arranged side by side in a circumferential direction, for generating first rotating magnetic fields rotating in the circumferential direction, by magnetic poles generated in the first armatures, and a second armature row formed by a plurality of second armatures (armatures 6a) arranged side by side in the circumferential direction, for generating second rotating magnetic fields rotating in a same direction as a direction of rotation of the first rotating magnetic fields, by magnetic poles generated in the second armatures, the stator being configured to be immovable, a first rotor 5 including a first magnetic pole row formed by a plurality of first magnetic poles (permanent magnets 5a) arranged in the circumferential direction, each two adjacent ones of the first magnetic poles having polarities different from each other, and arranged in a manner opposed to the first armature row, a second magnetic pole row formed by a plurality of second magnetic poles (permanent magnets 5a) arranged in the circumferential direction, each two adjacent ones of the second magnetic poles having polarities different from each other, and arranged in a manner opposed to the second armature row, the first rotor being connected to one of output shafts (crankshaft 21a) of the accessory 22, 23 and the engine 21, and a second rotor 7 including a first soft magnetic material element row formed by a plurality of first soft magnetic material elements (first cores 7a) arranged in the circumferential direction at predetermined intervals, and arranged between the first armature row and the first magnetic pole row, and a second soft magnetic material element row formed by a plurality of second soft magnetic material elements (second cores 7b) arranged in the circumferential direction at predetermined intervals, and arranged between the second armature row and the second magnetic pole row, the second rotor being connected to the other of the output shafts of the accessory 22, 23 and the engine, wherein when each magnetic pole of the first armature and each first magnetic pole are in a first opposed position opposed to each other, each magnetic pole of the second armature and each second magnetic pole are in a second opposed position opposed to each other; when each magnetic pole of the first armature and the first magnetic pole in the first opposed position have polarities different from each other, each magnetic pole of the second armature and each second magnetic pole in the second opposed position have polarities identical to each other; when each magnetic pole of the first armature and each first magnetic pole in the first opposed position have polarities identical to each other, each magnetic pole of the second armature and each second magnetic pole in the second opposed position have polarities different from each other, and wherein when each magnetic pole of the first armature and each first magnetic pole are in the first opposed position, if each first soft magnetic material element is in a position between the magnetic pole of the first armature and the first magnetic pole, each second soft magnetic material element is in a position between circumferentially adjacent two pairs of the magnetic poles of the second armatures and the second magnetic poles, and if each second soft magnetic material element is in a position between the magnetic pole of the second armature and the second magnetic pole, each first soft magnetic material element is in a position between circumferentially adjacent two pairs of the magnetic poles of the first armatures and the first magnetic poles.

According to this accessory drive system, the first soft magnetic material element row of the second rotor is disposed between the first armature row of the stator and the first magnetic pole row of the first rotor which are opposed to each other, and the first armatures, the first magnetic poles, and the first soft magnetic material elements forming the first armature row, the first magnetic pole row, and the first soft magnetic material element row, respectively, are all arranged side by side in the circumferential direction. Further, each adjacent two of the first soft magnetic material elements are spaced by a predetermined distance. Further, the second soft magnetic material element row of the second rotor is disposed between the second armature row of the stator and the second magnetic pole row of the first rotor which are opposed to each other, and the second armatures, the second magnetic poles, and the second soft magnetic material elements forming the second armature row, the second magnetic pole row, and the second soft magnetic material element row, respectively, are all arranged side by side in the circumferential direction. Further, each adjacent two of the second soft magnetic material elements are spaced by a predetermined distance. Further, the first and second rotating magnetic fields rotate in the same circumferential direction, and the stator is configured to be immovable, and the first rotor is connected one of the output shafts of the accessory and the engine.

As described above, the first soft magnetic material element row is disposed between the first armature row and the second magnetic pole row, and therefore, the first soft magnetic material elements are magnetized by the first magnetic poles generated on the first armatures (hereinafter referred to as "the first armature magnetic poles") and the first magnetic poles. Thus, since the first soft magnetic material elements are magnetized and each adjacent two of the first soft magnetic material elements are spaced, the magnetic lines of force (hereinafter referred to as "the first magnetic force lines") are generated between the first armature magnetic poles, the first soft magnetic material elements, and the first magnetic poles. Similarly, since the second soft magnetic material element row is disposed between the second armature magnetic row and the second magnetic pole row, the second soft magnetic material elements are magnetized by the magnetic poles generated on the second armatures (hereinafter referred to as "the second armature magnetic poles") and the second magnetic poles. Thus, since the second soft magnetic material elements are magnetized and each adjacent two of the second soft magnetic material elements are spaced, the magnetic lines of force (hereinafter referred to as "the second magnetic force lines") are generated between the second armature magnetic poles, the second soft magnetic material elements, and the second magnetic poles.

In the first place, a description will be given of the operation during stoppage of an internal combustion engine (hereinafter referred to as "the engine") in the case of the first rotor being connected to an accessory and the second rotor being connected to the output shaft of the engine. In a state where each first armature magnetic pole and each first magnetic pole in the first opposed position have polarities different from each other, if each first soft magnetic material element is not between a first armature magnetic pole and a first magnetic pole, each second armature magnetic pole and each second magnetic pole in the second opposed position have the same polarity, and each second soft magnetic material element is in a position between two pairs of second armature magnetic poles and second magnetic poles adjacent to each other in the second predetermined direction.

From this state, as the second rotating magnetic fields start rotation, each second armature magnetic pole moves away from the second opposed position in which it is opposed to each second magnetic pole having the same polarity, and moves closer to the second soft magnetic material element in a position between the two adjacent pairs of second armature magnetic poles and second magnetic poles.

In general, when the magnetic line of force is bent due to presence of a soft magnetic material element between two magnetic poles different in polarity, a magnetic force (attractive force) acts on the soft magnetic material element and the two magnetic poles so as to reduce the length of the magnetic line of force, and the magnetic force has a characteristic that it becomes larger as the degree of bend of the magnetic line of force is larger and the total amount of magnetic flux thereof is larger. Further, the friction of the engine acts on the second rotor, that is, the first and second soft magnetic material elements. Since the friction is by far larger than torque required for driving the accessory, the first and second soft magnetic material elements are in an almost unrotatable state.

Therefore, as the second armature magnetic pole becomes closer to the second magnetic material element, as described above, the total magnetic flux amounts of the second magnetic force line, which are large in the degree of bend, between the second magnetic material elements and the second magnetic poles increase, so that relatively large magnetic forces act on the second magnetic poles such that the second magnetic force line becomes shorter, in other words, the second magnetic poles are made closer toward the second soft magnetic material elements. Accordingly, the second magnetic poles are driven to be closer to the second soft magnetic material elements, so that the first rotor rotates in the reverse direction to the direction of rotation of the first and second rotating magnetic fields (hereinafter referred to as "the magnetic field rotation direction").

Then, as the second armature magnetic poles become still closer to the second soft magnetic material element, the second magnetic poles are also driven to become further closer to the second soft magnetic material elements. As a result, the second armature magnetic poles are brought to the second opposed position in which they are opposed to the second magnetic poles different in polarity with the second magnetic material elements positioned therebetween. In this state, as described above, the first armature magnetic poles are in the first opposed position opposed to the first magnetic poles having the same polarity, and each first soft magnetic material element is between two pairs of first armature magnetic poles and first magnetic poles which are adjacent to each other in the circumferential direction.

From this state, as the first rotating magnetic fields start rotation, each first armature magnetic pole moves away from the first opposed position in which it is opposed to each second magnetic pole having the same polarity, and moves closer to the first soft magnetic material element in a position between the two adjacent pairs of first armature magnetic poles and first magnetic poles. The total magnetic flux amounts of the first magnetic force line, which are large in the degree of bend, between the first magnetic material elements and the first magnetic poles increase, so that relatively large magnetic forces act on the second magnetic poles such that the second magnetic force line becomes shorter, in other words, the first magnetic poles are made closer toward the second soft magnetic material elements. Accordingly, the first magnetic poles are driven to be closer to the first soft magnetic material elements, so that the first rotor rotates in the reverse direction to the magnetic field rotation direction.

Then, as the first armature magnetic poles become still closer to the first soft magnetic material element, the first magnetic poles are also driven to become further closer to the first soft magnetic material elements. As a result, the first armature magnetic poles are brought to the first opposed position in which they are opposed to the first magnetic poles having a different polarity with the first soft magnetic material elements positioned therebetween. In this state, as described above, the second armature magnetic poles are in the second opposed position opposed to the second magnetic poles having the same polarity, and each second soft magnetic material element is between two pairs of second armature magnetic poles and second magnetic poles which are adjacent to each other in the circumferential direction.

As described above, as the first and second rotating magnetic fields rotate, the magnetic forces alternately act on the first and second magnetic poles, whereby the first rotor rotates with substantially constant torque. Since the first rotor is connected to the accessory, as described above, the torque of the first rotor is transmitted to the accessory, so that the accessory is driven. As described, during stoppage of the engine, electric power is supplied to the stator to cause rotation of the first and second rotating magnetic fields, whereby the accessory can be driven.

Next, a description will be given of the operation during operation of the engine. As described above, the first and second soft magnetic material elements are magnetized by the opposed first and second magnetic poles. Further, the second rotor is connected to the output shaft of the engine, during operation of the engine, the magnetized first and second soft magnetic material elements rotate relative to the stator, whereby an induced electromotive force is generated in the first and second armatures, for generation of electric power. As a result, even in a state where electric power is not supplied to the first and second armatures, the induced electromotive force causes the generation of the first and second rotating magnetic fields. Therefore, in this case as well, the magnetic forces caused by the first and second magnetic force line act on the first and second magnetic poles, whereby the first rotor rotates to drive the accessory.

Next, a description will be given of the operation during stoppage of the engine in the case of the first rotor being connected to the output shaft of the engine and the second rotor being connected to the accessory. In this case, the friction of the engine acts on the first rotor, that is, the first and second magnetic poles. Since the friction is by far larger than torque required for driving the accessory, the first and second magnetic poles are in a state in which they can hardly rotate.

In this case as well, as described above, in a state where each first armature magnetic pole and each magnetic pole have polarities different from each other, when each first soft magnetic element is between the first armature magnetic pole and the first magnetic pole, each second armature magnetic pole and each second magnetic pole in the second opposed position have the same polarity, and each second soft magnetic material is in a position between two pairs of second armature magnetic pole and second magnetic poles adjacent to each other in the circumferential direction.

In this state, the length of the first magnetic line of force becomes shortest, and the total magnetic flux amounts thereof becomes largest, while the second magnetic line of force is large in the degree of bend thereof and largest in its length, with the smallest total magnetic flux amount.

From this state, when the first rotating magnetic fields start to rotate, the first magnetic force line which are large in their total magnetic flux amounts start to be bent, and hence relative large magnetic forces act on the first soft magnetic material elements such that the length of the first magnetic force line becomes short, whereby the first soft magnetic material elements are driven in the magnetic field rotating direction to cause the rotation of the second rotor in the magnetic field rotating direction. Further, as the second rotating magnetic fields rotate simultaneously with the rotation of the first rotating magnetic fields, the second armature magnetic poles move from the second opposed position in which they opposed to second magnetic poles having the same polarity toward ones of the second magnetic poles having a different polarity which are adjacent to those having the same polarity. In this state, although the degree of bend of the second magnetic force line is large, the total magnetic flux amounts thereof are small, and hence relative weak magnetic forces act on the second soft magnetic material elements, whereby the second soft magnetic material is driven in the magnetic field rotating direction by small driving forces, so that the second rotor rotates in the magnetic field rotating direction.

Then, when the first rotating magnetic fields further rotate, although the degree of bend of the first magnetic force line increases, the distance from the first armature magnetic poles to the first magnetic poles having a different polarity increases to reduce the total magnetic flux amounts of the first magnetic force line, which weakens the magnetic forces acting on the first soft magnetic material elements, to reduce the driving forces acting on the first soft magnetic material elements. Then, when each first armature magnetic pole is brought to the first opposed position in which it is opposed to a first magnetic pole having the same polarity, each first soft magnetic material element is brought to a position between two pairs of first armature magnetic poles and first magnetic pole adjacent to each other in the circumferential direction, whereby in spite of the first magnetic force line being large in the degree of bend, the total magnetic flux amounts thereof become the minimum, so that the magnetic forces acting on the first soft magnetic material element become weakest to reduce the driving forces acting on the first soft magnetic material element to the minimum.

Further, as the second rotating magnetic fields rotate simultaneously with the rotation of the first rotating magnetic fields, as described above, the second armature magnetic poles move from the second opposed position in which they are opposed to second magnetic poles having the same polarity toward ones of the second magnetic poles having a different polarity which are adjacent to those having the same polarity. In this state, although the degree of bend of the second magnetic force line becomes small, the total magnetic flux amounts increase, so that the magnetic forces acting on the second soft magnetic material elements increase to increase the driving forces acting on the second soft magnetic material elements. Then, when each second armature magnetic pole is brought to the second opposed position in which it is opposed to each second magnetic pole having a different polarity, the total magnetic flux amount of the second magnetic line of force becomes largest and each second soft magnetic material element rotates in a state slightly delayed relative to the second armature magnetic pole, whereby the second magnetic force line are bent. Thus, the second magnetic force line which are largest in the total magnetic flux amount are bent, whereby the magnetic forces acting on the second soft magnetic material elements become strongest, to make largest the driving forces acting on the second soft magnetic material elements.

Further, when the first rotating magnetic fields further rotate from the above-mentioned state in which the magnetic forces acting on the first soft magnetic material elements are substantially weakest and the magnetic forces acting on the second soft magnetic material elements are substantially strongest, although the degree of bend of the first magnetic force line becomes small, the total magnetic flux amounts thereof increase, so that the magnetic forces acting on the first soft magnetic material elements increase to increase the driving forces acting on the first soft magnetic material elements. Then, when each first armature magnetic pole is brought to the first opposed position in which it is opposed to a first magnetic pole having a different magnetic pole, the total magnetic flux amount of the first magnetic line of force becomes largest and each first soft magnetic material element rotates in a state slightly delayed relative to the first armature magnetic pole, whereby the first magnetic force line are bent. Thus, the first magnetic force line which are largest in the total magnetic flux amount are bent, whereby the magnetic forces acting on the first soft magnetic material elements become strongest, to make largest the driving forces acting on the first soft magnetic/material elements.

Further, as the second rotating magnetic fields rotate simultaneously with the above-described rotation of the first rotating magnetic fields, the second armature magnetic poles move from the second opposed position in which they are opposed to second magnetic poles having a different polarity toward ones of the second magnetic poles which have the same polarity and are adjacent to those having the different polarity. In this state, although the degree of bend of the second magnetic force line becomes larger, the total magnetic flux amounts decrease, so that the magnetic forces acting on the second soft magnetic material elements become weaker to reduce the driving forces acting on the second soft magnetic material elements. Then, when each second armature magnetic pole is brought to the second opposed position in which it is opposed to a second magnetic pole having the same polarity, each second soft magnetic material element is brought to a position between two pairs of second armature magnetic poles and second magnetic pole adjacent to each other in the circumferential direction, whereby in spite of each second magnetic force line being large in the degree of bend, the total magnetic flux amount thereof becomes the minimum, so that the magnetic forces acting on the second soft magnetic material element becomes weakest to reduce the driving forces acting on the first soft magnetic material element to the minimum.

As described, according to the rotations of the first and second magnetic fields, the first and second soft magnetic material element rotate together with the second rotor while repeating a state in which the driving forces acting on the first soft magnetic material elements and the driving forces acting on the second soft magnetic material elements alternately become larger and smaller. Although such driving forces act on the first and second magnetic material elements, since the first and second soft magnetic material elements are provided on the second rotor, the torque of the second rotor becomes equal to the sum of the two driving forces and substantially constant. Since this second rotor is connected to the accessory, as described above, the torque of the second rotor is transmitted to the accessory, so that the accessory is driven. As described, in this case as well, during stoppage of the engine, electric power is supplied to the stator to cause rotation of the first and second rotating magnetic fields, whereby the accessory can be driven.

Further, as described, even during operation of the engine, by supplying electric power to the stator to cause rotation of the first and second rotating magnetic fields, the magnetic forces caused by the first and second magnetic force lines act on the first and second soft magnetic material elements, whereby the second rotor rotates to drive the accessory.

As described hereinbefore, in both of the cases where the first rotor is connected to the accessory, and at the same time, the second rotor is connected to the engine, and where the second rotor is connected to the accessory, and at the same time, the first rotor is connected to the engine, differently from the aforementioned conventional accessory drive system, it is possible to drive the accessory during stoppage and operation of the engine without using the clutch. This makes it possible to eliminate the clutch to thereby achieve downsizing of the accessory drive system 1 and reduction of manufacturing costs thereof. Further, since this makes it possible to prevent clutch noises from being generated when the clutch is engaged and disengaged, it is possible to enhance marketability of the accessory drive system.

It should be noted that throughout the present specification, "when the first armature magnetic pole(s) (second armature magnetic pole(s)) and the first magnetic pole(s) (second magnetic pole(s)) are in a position opposed to each other" is not intended to mean that the two are in completely the same position in the circumferential direction, but to also mean that they are in respective locations slightly different from each other.

This invention as claim in claim 2 is an accessory drive system 1, 30 as claims in claim 1, wherein the first and second armature rows are formed by a single mutually common armature row.

With this arrangement, the first and second armature rows are formed by a single mutually common armature row, and therefore, compared with the case where the two are formed separately, the number of parts can be reduced, whereby it is possible to achieve further downsizing of the accessory drive system and further reduction of manufacturing costs thereof.

Best Mode for Carrying Out the Invention

The present invention will now be described in detail with reference to the drawings showing a preferred embodiment thereof. It should be noted that in the figures, hatching in portions illustrating cross-sections are omitted for convenience. FIG. 1 schematically shows an accessory drive system 1 according to the present embodiment together with an internal combustion engine 21 and an accessory 22. The internal combustion engine (hereinafter simply referred to as "the engine") 21 is e.g. a gasoline engine installed on a vehicle (not shown), and is equipped with a crank angle sensor 15. The crank angle sensor 15 detects the crank angle position of a crankshaft 21a (output shaft) of the engine 21, and delivers a signal indicative of the sensed crank angle position to an ECU 13, described hereinafter. The accessory 22 is e.g. a compressor of an automotive air conditioner, and has an input shaft 22a thereof integrally formed with an input pulley 8.

Referring to FIG. 1, the accessory drive system 1 is comprised of a power transmission drive system 2 connected to the engine 21, a PDU 11 connected to the power transmission drive system 2, a battery 12, and the ECU 13. The power transmission drive system 2 has the function of converting electric power supplied from the battery 12 into a driving force to output the same from an output shaft 4, referred to hereinafter, and the function of outputting part of a driving force input from the engine 21 from the output shaft 4, and converting the rest of the input driving force into electric power for power generation. Detailed description thereof will be given hereinafter. Further, the output shaft 4 is integrally formed with an output pulley 9, and a belt 10 extends around the output pulley 9 and the above-mentioned input pulley 8. With this arrangement, the driving force from the output shaft 4 is input to the accessory 22 via the input and output pulleys 8 and 9 and the belt 10 to thereby drive the accessory 22.

As shown in FIGS. 1 and 2, the power transmission drive system 2 is comprised of a casing 3, the output shaft 4, a first rotor 5 disposed in the casing 3, a stator 6 disposed within the casing 3 in a manner opposed to the first rotor 5, and a second rotor 7 disposed between the two 5 and 6 at predetermined spaced intervals. The first rotor 5, the second rotor 7, and the stator 6 are radially arranged from the inner side in the mentioned order.

The casing 3 has a hollow cylindrical peripheral wall 3a, and side walls 3b and 3c formed integrally therewith and arranged on opposite side ends of the peripheral wall 3a in a manner opposed to each other. The side walls 3b and 3c are annular plate-shaped members having holes 3d and 3e formed through the respective centers thereof, and the outer diameters thereof are equal to that of the peripheral wall 3a. Further, the peripheral wall 3a and the side walls 3b and 3c are arranged concentrically with each other. Furthermore, bearings 3f and 3g are fitted in the above holes 3d and 3e, respectively. The crankshaft 21a of the engine 21 is rotatably fitted in the former 3f, and the output shaft 4 is rotatably supported by the latter 3g. With this arrangement, the output shaft 4 is disposed concentrically with the crankshaft 21a. It should be noted that the output shaft 4 is made substantially axially immovable by a thrust bearing (not shown). Hereinafter, the left side and the right side as viewed in FIG. 2 will be referred to as "left" and "right" as deemed appropriate.

The first rotor 5 has 2n permanent magnets 5a (first magnetic poles and second magnetic poles). The permanent magnets 5a are mounted on the outer peripheral surface of an annular fixing portion 5b in a state arranged at equally spaced intervals in the circumferential direction of the output shaft 4 (hereinafter simply referred to as "in the circumferential direction" or "circumferentially"). Each permanent magnet 5a has a generally sector-shaped cross-section orthogonal to the axial direction of the output shaft 4 (hereinafter simply referred to as "in the axial direction" or "axially"), and slightly extends in the axial direction. The above-mentioned fixing portion 5b is formed of a soft magnetic material element, such as iron, and has an inner peripheral surface thereof attached to the outer peripheral surface of a disk-shaped flange 5c integrally concentrically formed with the output shaft 4. With the above arrangement, the permanent magnets 5a are rotatable in unison with the output shaft 4.

Further, as shown in FIG. 3, a central angle formed by each two permanent magnets 5a circumferentially adjacent to each other about the output shaft 4 is a predetermined angle θ. Further, the two permanent magnets 5a circumferentially adjacent to each other have polarities different from each other. Hereafter, respective magnetic poles on the left side and the right side of the permanent magnet 5a are referred to as "the first magnetic pole" and "the second magnetic pole", respectively.

The stator 6 generates rotating a magnetic field, and has 3n armatures 6a (first armatures and second armatures) arranged equally spaced intervals in the circumferential direction. Each armature 6a is comprised of an iron core 6b, and a coil 6c wound around the iron core 6b. The iron core 6b has a generally sector-shaped cross-section orthogonal to the axial direction, and has approximately the same axial length as that of the permanent magnet 5a. An axially central portion of the inner peripheral surface of the iron core 6b is formed with a circumferentially extending groove 6d. The 3n coils 6c form n sets of three-phase (U-phase coils, V-phase coils, and W-phase coils) coils (see FIG. 3). Further, the armature 6a are mounted on the inner peripheral surface of the peripheral wall 3a via an annular fixing portion 6e such that the armatures 6a are immovable. Due to the numbers and the arrangements of the armatures 6a and the permanent magnets 5a, when the center of a certain armature 6a circumferentially coincides with the center of a certain permanent magnet 5a, the center of every three armatures 6a from the armature 6a, and the center of every two permanent magnets 5a from the permanent magnet 5a circumferentially coincides with each other.

Furthermore, each armature 6a is connected to the battery 12 and the ECU 13 via the PDU 11, and configured such that when electric power is supplied or generated, magnetic poles having different polarities from each other are generated on the left and right ends of the iron core 6b, respectively. Further, in accordance with generation of these magnetic poles, first and second rotating magnetic fields are generated between the left portion of the first rotor 5 (on the first magnetic pole side) and the left end of the iron core 6b, and between the right portion of the first rotor 5 (on the second magnetic pole side) and the right end of the iron core 6b in a circumferentially rotating manner, respectively. Hereinafter, the magnetic poles generated on the left and right ends of the iron core 6b are referred to as "the first armature magnetic pole" and "the second armature magnetic pole". Further, the number of the first armature magnetic poles and that of the second armature magnetic poles are equal to the number of the magnetic poles of the permanent magnets 5a, that is, 2n.

The second rotor 7 has a plurality of first cores 7a (first soft magnetic material elements) and a plurality of second cores 7b (second soft magnetic material elements). The first and second cores 7a and 7b are arranged at equally spaced intervals in the circumferential direction, respectively, and the numbers of 7a and 7b are both set to be equal to that of the permanent magnets 5a that is, 2n. Each first core 7a is formed by laminating soft magnetic material pats, such as a plurality of steel sheets, such that it has a generally sector-shaped cross-section orthogonal to the axial direction, and axially extends by a length approximately equal to a half of the length of the permanent magnet 5a in the axial direction. Similarly to the first core 7a, each second core 7b is formed by laminating a plurality of steel plates, such that it has a generally sector-shaped cross-section orthogonal to the axial direction, and axially extends by a length approximately equal to a half of the length of the permanent magnet 5a in the axial direction.

The first and second cores 7a and 7b are mounted on an outer end of a disk-shaped flange 7e by bar-shaped connecting portions 7c and 7d slightly extending in the axial direction, respectively. The flange 7e is integrally concentrically fitted on the crankshaft 21a. With this arrangement, the first and second cores 7a and 7b are rotatable in unison with the crankshaft 21a.

Further, the first cores 7a are each axially arranged between the left portion of the first rotor 5 (on the first magnetic pole side) and the left portion of the stator 6 (on the first armature magnetic pole side), and the second cores 7b are each axially arranged between the right portion of the first rotor 5 (on the second magnetic pole side) and the right portion of the stator 6 (on the second armature magnetic pole side). Furthermore, the second cores 7b are circumferentially alternately arranged with respect to the first cores 7a, and the center of the second cores 7b is displaced by a half of the aforementioned predetermined angle θ from the center of the first cores 7a.

Further, the power transmission drive system 2 is provided with a rotational angle sensor 16. The rotational angle sensor 16 detects a rotational angle position of the first rotor 5, and delivers a signal indicative of the sensed rotational angle position to the ECU 13.

The PDU 11 and the ECU 13 controls the power transmission drive system 2. The former 11 is implemented by an electric circuit comprised of an inverter, and the latter 13 is implemented by a microcomputer including an I/O interface, a CPU, a RAM, and a ROM. Further, the ECU 13 determines the relative positional relationship between the permanent magnets 5a, the armatures 6a, and the first and second cores 7a and 7b, based on the detected rotational angle position of the first rotor 5 and the detected crank angle position, and controls energization of the three-phase coils 6c of the armatures 6a based on the positional relationship to thereby control the first and second rotating magnetic fields.

In the power transmission drive system 2 configured as above, as shown in FIG. 3, during generation of the first and second rotating magnetic fields, when the polarity of each first armature magnetic pole is different from the polarity of an opposed (closest) one of the first magnetic poles, the polarities of each second armature magnetic pole become the same as the polarity of an opposed (closest) one of the second magnetic poles. Further, when each first core 7a is in a position between each first magnetic pole and each first armature magnetic pole, each second core 7b is in a position between a pair of second magnetic poles circumferentially adjacent to each other and a pair of second armature magnetic poles circumferentially adjacent to each other. Furthermore, although not shown, during generation of the first and second rotating magnetic fields, when the polarity of each second armature magnetic pole is different from the polarity of an opposed (closest) one of the second magnetic poles, the polarity of each first armature magnetic pole becomes the same as the polarity of an opposed (closest) one of the first magnetic poles. Further, when each second core 7b is in a position between each second magnetic pole and each second armature magnetic pole, each first core 7a is in a position between a pair of first armature magnetic poles circumferentially adjacent to each other, and a pair of first magnetic poles circumferentially adjacent to each other.

Next, a description will be given of the operation of the power transmission drive system 2 during stoppage of the engine 21. In this case, the friction of the engine 21 acts on the second rotor 7, that is, the first and second cores 7a and 7b. Since the friction is by far larger than torque required for driving the accessory 22, the first and second cores 7a and 7b are in an almost unrotatable state. In such a state, the ECU 13 controls the PDU 11 to thereby supply the stator 6 with electric power to generate the first and second rotating magnetic fields, whereby the output shaft 4 integrally formed with the first rotor 5 is rotated for driving the accessory 22.

It should be noted that although in FIG. 3, the armatures 6a and the fixing portion 6e are shown as if they were each divided into two parts since FIG. 3 is shown as a development view, actually, they are integrally formed with each other, so that the arrangement in FIG. 3 can be shown as in FIG. 4 as equivalent thereto. Therefore, hereinafter, the operation of the power transmission drive system 2 is described assuming that the permanent magnets 5a, the armatures 6a, and the first and second cores 7a and 7b are arranged as shown in FIG. 4.

Further, for convenience of description, the operation of the power transmission drive system 2 is described by replacing the motion of the first and second rotating magnetic fields by an equivalent physical motion of 2n imaginary permanent magnets (hereinafter referred to as "the imaginary magnets") VM, equal in number to the permanent magnets 5a. Further, the description will be given by regarding a magnetic pole at a left-side portion of each imaginary magnet VM (on the first magnetic pole side), and a magnetic pole at a right-side portion of the imaginary magnet VM (on the second magnetic pole side) are regarded as the first and second armature magnetic poles, respectively, and rotating magnetic fields generated between the left-side portion of the imaginary magnet VM and the left portion of the first rotor 5 (on the first magnetic pole side), and between the right-side portion of the imaginary magnet VM and the right portion of the first rotor 5 (on the second magnetic pole side) are regarded as first and second rotating magnetic fields. Furthermore, hereinafter, the left-side portion and the right-side portion of the permanent magnet 5a are referred to as "the first magnet portion" and "the second magnet portion".

First, as shown in FIG. 5(a), the first and second rotating magnetic fields are generated in a manner rotated downward, as viewed in the figure, from a state in which each first core 7a is opposed to each first magnet portion, and each second core 7b is in a position between each adjacent two of the second magnet portions. At the start of the generation of the first and second rotating magnetic fields, the polarity of each first armature magnetic pole is made different from the polarity of an opposed one of the first magnetic poles, and the polarity of each second armature magnetic pole is made the same as the polarity of an opposed one of the second magnetic poles.

Since the first cores 7a are disposed as described above, they are magnetized by the first magnetic poles and the first armature magnetic poles, and magnetic lines of force (hereinafter referred to as "the first magnetic force lines") G1 are generated between the first magnetic poles, the first cores 7a, and the first armature magnetic poles. Similarly, since the second cores 7b are disposed as described above, they are magnetized by the second armature magnetic poles and the second magnetic poles, and magnetic lines of force (hereinafter referred to as "the second magnetic force lines") G2 are generated between the first armature magnetic poles, the second cores 7b, and the second magnetic poles.

In the state shown in FIG. 5(a), the first magnetic lines G1 are generated such that they each connect the first magnetic pole, the first core 7a, and the first armature magnetic pole, and the second magnetic lines G2 are generated such that they connect each circumferentially adjacent two second armature magnetic poles and the second core 7b located therebetween, and connect each circumferentially adjacent two second magnetic poles and the second core 7b located therebetween. As a result, in this state, magnetic circuits as shown in FIG. 7(a) are formed.

In this state, since the first magnetic lines G1 are linear, no magnetic forces for circumferentially rotating the first magnet portion act on the first magnet portions. Further, the two second magnetic lines G2 between each circumferentially adjacent two second armature magnetic poles and the second core 7b are equal to each other in the degree of bend thereof and in the total magnetic flux amount. Similarly, the two second magnetic lines G2 between each circumferentially adjacent two second magnetic poles and the second core 7b are equal to each other in the degree of bend thereof and in the total magnetic flux amount. As a consequence, the second magnetic lines G2 are balanced. Therefore, no magnetic forces for circumferentially rotating the second magnet portions act on the second magnet portions, either. From the above, the permanent magnets 5a are held at rest.

When the imaginary magnets VM rotate from the position shown in FIG. 5(a) to a position shown in FIG. 5(b), the first magnetic lines G1 between the first cores 7a and the first armature magnetic poles are bent, and accordingly the second armature magnetic poles become closer to the second cores 7b, whereby the second magnetic lines G2 are formed such that they connect between the second armature magnetic poles, the second cores 7b, and the second magnetic poles. As a consequence, magnetic circuits are formed between the permanent magnets 5a, the imaginary magnets VM, and the first and second cores 7a and 7b, as shown in FIG. 7(b).

In this state, although the total magnetic flux amount of the first magnetic line G1 between the first magnetic pole and the first core 7a is large, the first magnetic line G1 is straight, and hence no magnetic forces are generated which cause the first magnet portions to rotate with respect to the first core 7a. Further, since the distance from second the magnetic pole to the second armature magnetic pole having a different polarity is relatively large, the total magnetic flux amount of the second magnetic line G2 between the second core 7b and the second magnetic pole is relatively small. However, the degree of bend of the second magnetic line G2 is large, magnetic forces act on the second permanent portions, so as to that make the second magnet portions closer to the second core 7b. This causes the permanent magnets 5a to be driven in the direction of rotation of the imaginary magnets VM, that is, in a direction (upward, as viewed in FIG. 5) opposite to the direction of rotations of the first and second rotating magnetic fields (hereinafter referred to as "the magnetic field rotation direction"), and be rotated toward a position shown in FIG. 5(c). In accordance with this, the first rotors 5 rotate in unison with the output shaft 4 in an direction opposite to the magnetic field rotation direction.

While the permanent magnets 5a rotate from the position shown in FIG. 5(b) toward the position shown in FIG. 5(c), the imaginary magnets VM rotate toward a position shown in FIG. 5(d). As described above, although the second magnet portions become closer to the second cores 7b to make the degree of bend of the second magnetic lines G2 between the second cores 7b and the second magnetic poles smaller, the imaginary magnets VM become further closer to the second cores 7b, which increases the total magnetic flux amounts of the second magnetic lines G2. As a result, in this case as well, the magnetic forces act on the second magnet portions so as to make the second magnet portions closer to the second cores 7b, whereby the permanent magnets 5a are driven in the direction opposite to the magnetic field rotation direction.

Further, as the permanent magnets 5a rotate in the direction opposite to the magnetic field rotation direction, the first magnetic lines G1 between the first magnetic poles and the first cores 7a are bent along with the rotation of the permanent magnets 5a, whereby magnetic forces act on the first magnet portions so as to make the first magnet portions closer to the first cores 7a. In this state, however, a magnetic force caused by the first magnetic line G1 is smaller than the aforementioned magnetic force caused by the second magnetic line G2, since the degree of bend of the first magnetic line G1 is smaller than that of the second magnetic line G2. As a result, a magnetic force corresponding to the difference between the two magnetic forces drives the permanent magnet 5a in the direction opposite to the magnetic field rotation direction.

Then, as shown in FIG. 5(d), when the distance between the first magnetic pole and the first core 7a, and the distance between the second core 7b and the second magnetic pole have become approximately equal to each other, the total magnetic flux amount and the degree of bend of the first magnetic line G1 between the first magnetic pole and the first core 7a become approximately equal to the total magnetic flux amount and the degree of bend of the second magnetic line G2 between the second core 7b and the second magnetic pole, respectively. As a result, the magnetic forces caused by the first and second magnetic lines G1 and G2 are approximately balanced, whereby the permanent magnet 5a is temporarily placed in an undriven state.

From this state, when the imaginary magnets VM rotate to a position shown in FIG. 6(a), the state of generation of the first magnetic lines G1 is changed to form magnetic circuits as shown in FIG. 6(b). Accordingly, the magnetic forces caused by the first magnetic lines G1 come to hardly act on the first magnet portions such that the magnetic forces make the first magnet portions closer to the first core 7a, and therefore the permanent magnets 5a are driven by the magnetic forces caused by the second magnetic lines G2, to a position shown in FIG. 6(c), in the direction opposite to the magnetic field rotation direction.

Then, when the imaginary magnets VM slightly rotate from the position shown in FIG. 6(c), inversely to the above, the magnetic forces caused by the first magnetic lines G1 between the first magnetic poles and the first cores 7a act on the first magnet portions so as to make the first magnet portions closer to the first cores 7a, whereby the permanent magnets 5a are driven in the direction opposite to the magnetic field rotation direction, to rotate the output shaft 4 in the direction opposite to the magnetic field rotation direction. Then, when the imaginary magnets VM further rotate, the permanent magnets 5a are driven in the direction opposite to the magnetic field rotation direction, by respective magnetic forces corresponding to the differences between the magnetic forces caused by the first magnetic lines G1 between the first magnetic poles and the first cores 7a, and the magnetic forces caused by the second magnetic lines G2 between the second cores 7b and the second magnetic poles. After that, when the magnetic forces caused by the second magnetic lines G2 come to hardly act on the second magnet portions so as to make the second magnet portions closer to the first cores 7a, the permanent magnets 5a are driven by the magnetic forces caused by the first magnetic lines G1.

As described hereinabove, in accordance with the rotations of the first and second rotating magnetic fields, the magnetic forces caused by the first magnetic lines G1 between the first magnetic poles and the first cores 7a, the magnetic forces caused by the second magnetic lines G2 between the second cores 7b and the second magnetic poles, and the magnetic forces corresponding to the differences between the above magnetic forces alternately act on the permanent magnets 5a, i.e. on the output shaft 4, whereby the output shaft 4 is rotated in the direction opposite to the magnetic field rotation direction. Further, the magnetic forces, that is, the driving forces thus act on the output shaft 4 alternately, whereby the torque of the output shaft 4 is made approximately constant. Furthermore, as described heretofore, the driving force of the output shaft 4 is input to the accessory 22 via the input and output pulleys 8 and 9, and the belt 10, whereby the accessory 22 is driven.

Further, in this case, the first rotor 5 integrally formed with the output shaft 4 rotates at the same speed as that of the first and second rotating magnetic fields, in the reverse direction, and the rotational speed VR of the first rotor 5 (hereinafter referred to as "the rotor rotational speed") and the rotational speed VF of the first and second rotating magnetic fields (hereinafter referred to as "the magnetic field rotational speed") satisfy the relationship of VR=−VF. More specifically, in this case, the relationship between the magnetic field rotational speed VF, the rotor rotational speed VR, and the rotational speed VC of the crankshaft 21a (hereinafter referred to as "the crankshaft rotational speed") is represented as shown in FIG. 8(a). This is because the magnetic forces caused by the first and second magnetic lines G1 and G2 act to cause the permanent magnets 5a, i.e. the first rotor 5, to be rotated such that the first and second cores 7a and 7b being held at respective midpoint locations between the first magnetic pole and the first armature magnetic pole, and between the second magnetic pole and the second armature magnetic pole.

Furthermore, the ECU 13 calculates the rotor rotational speed VR based on the crank angle position of the first rotor 5 detected by the above-mentioned rotational angle sensor 16, and controls the magnetic field rotational speed VF such that the calculated rotor rotational speed VR becomes equal to a predetermined value VREF (see FIG. 8(a)). This holds the rotational speed of the input shaft 22a of the accessory 22 at a predetermined value suitable for the operation of the accessory 22.

Next, a description will be given of the operation of the power transmission drive system 2 during operation of the engine 21. In this case, since the crankshaft 21a is rotating, the second rotor 7, that is, the first and second cores 7a and 7b as well rotate. Further, as described hereinabove, the first and second cores 7a and 7b are magnetized by the first and second magnetic poles of the permanent magnets 5a opposed thereto. As described above, the magnetized first and second cores 7a and 7b rotate relative to the stator 6, and the ECU 13 controls the PDU 11, whereby an induced electromotive force is generated in the armatures 6a to generate electric power.

As a result, as shown in FIGS. 8(b) and 8(c), even in a state where electric power is not supplied to the armatures 6a, first and second rotating magnetic fields are generated by the induced electromotive force, and the generated first and second rotating magnetic fields rotate in a direction opposite to the direction of rotation thereof during supply of electric power to the armatures 6a. Therefore, in this case as well, the magnetic forces caused by the first and second magnetic lines G1 and G2 act on the permanent magnets 5a, whereby the output shaft 4 rotates to drive the accessory 22. As described above, during operation of the engine 21, it is possible to drive the accessory 22, while generating electric power. It should be noted that electric power obtained by the generation of electric power charges the battery 12. This makes it possible to drive the accessory 22 using the charged electric power during the next stoppage of the engine 21.

Further, in this case, the magnetic field rotational speed VF, the rotor rotational speed VR, and the crankshaft rotational speed VC satisfy the following relationship: As described above, due to the actions of the magnetic forces caused by the first and second magnetic lines G1 and G2, the permanent magnets 5a rotate, with the first and second cores 7a and 7b being held at respective midpoint locations between the first magnetic poles and the first armature magnetic poles and between the second magnetic poles and the second armature magnetic poles. Therefore, the crankshaft rotational speed VC of the crankshaft 21 integrally formed with the first and second cores 7a and 7b becomes equal to an average value of the sum of the magnetic field rotational speed VF and the rotor rotational speed VR.

Therefore, the relationship between the magnetic field rotational speed VF, the rotor rotational speed VR, and the crankshaft rotational speed VC during operation of the engine 21 can be expressed by the following equation (1):

$$VC=(VF+VR)/2 \quad (1)$$

Similarly to the above-described case of the operation during stoppage of the engine 21, in this case as well, the ECU 13 controls the magnetic field rotational speed VF by controlling the frequency of electric current flowing through the armatures 6a such that the rotor rotational speed VR becomes equal to the predetermined value VREF. This causes, as shown in FIGS. 8(b) and 8(c), the rotor rotational speed VR to be controlled to the predetermined value VREF, and the rotational speed of the input shaft 22a of the accessory 22 to be held at the predetermined value suitable for the operation of the accessory 22, irrespective of whether the crankshaft rotational speed VC is high or low.

Further, as shown in FIG. 8(d), when the crankshaft rotational speed VC is very low, as indicated by a broken line in the figure, it is sometimes impossible to increase the rotor rotational speed VR to the predetermined value VREF, by controlling the magnetic field rotational speed VF of the first and second rotating magnetic fields generated by generation of electric power. In such a case, the first and second rotating magnetic fields are generated by supply of electric power to the armatures 6a and the magnetic field rotational speed VF is controlled, whereby it is possible to increase the rotor rotational speed VR to the predetermined value VREF, as indicated by a solid line in FIG. 8(d).

Further, to stop the accessory 22 during operation of the engine 21, it is only required in this case to reduce the rotor rotational speed VR to a value of 0, and hence as is apparent from the above equation (1), the magnetic field rotational speed VF is controlled to become twice as high as the crankshaft rotational speed VC. This controls the rotor rotational speed VR to a value of 0, whereby the accessory 22 is stopped, and approximately 100% of the driving force of the engine 212 input to the power transmission drive system 2 is converted to electric power.

As described hereinbefore, according to the present embodiment, differently from the aforementioned conventional accessory drive system, it is possible to drive the accessory 22 when the engine 21 is stoppage and in operation without using the clutch. Therefore, the omission of the clutch makes it possible to achieve downsizing and reduction of manufacturing costs of the accessory drive system 1. Further, since no clutch noises are generated, it possible to enhance marketability. Furthermore, since the stator generating the first and second rotating magnetic fields is formed by a single stator 6, it is possible to achieve further downsizing of the accessory drive system 1 and further reduction of manufacturing costs thereof.

Further, during operation of the engine 21, by controlling the magnetic field rotational speed VF, it is possible to hold the rotational speed of the input shaft 22a of the accessory 22 at a predetermined value suitable for the operation of the accessory 22, irrespective of whether the crankshaft rotational speed VC is high or low. Therefore, differently from the aforementioned conventional accessory drive system, it is possible to downsize the accessory 22.

Next, a first variation of the above-described embodiment will be described with reference to FIG. 9. In the first variation, a power transmission drive system 2A is mainly distinguished from the above-described power transmission drive system 2 in that the stator 6, the second rotor 7, and the first rotor 5 are arranged from a radially inner side in the mentioned order. In the figure, component elements of the power transmission drive system 2A, identical to those of the power transmission drive system 2 are designated by identical reference numerals. Hereinafter, a description will be mainly given of points different from the above-described embodiment.

The armatures 6a are mounted on a disk-shaped fixing portion 6f. The fixing portion 6f is fixed to the engine 21 by a connecting portion 6g. With this arrangement, the armatures 6a, i.e. the stator 6 is configured to be immovable.

Further, the permanent magnets 5a are mounted on the inner peripheral surface of an annular fixing portion 5d. The outer peripheral surface of the annular fixing portion 5d is integrally attached to the inner peripheral surface of an annular pulley 9A. The aforementioned belt 10 extends around the pulley 9A. Further, the above fixing portion 5d is connected to one end of a hollow cylindrical first connecting portion 5e. The other end of the first connecting portion 5e is connected to a hollow shaft 5g by a second connecting portion 5f in the form of an annular plate. The shaft 5g is rotatably supported by a bearing 5h, and has the crankshaft 21a concentrically rotatably fitted therein. It should be noted that similarly to the above-described embodiment, the armatures 6a and the permanent magnets 5a are arranged at equal intervals in the circumferential direction, respectively, and the numbers thereof are the same as those of the above-described embodiment.

With the above arrangement, it is possible to obtain the same advantageous effects as provided by the above-described embodiment. Further, although in the above-described power transmission drive system 2, the output pulley 9 is provided separately from the stator 6 and so forth, in the power transmission drive system 2A, the first rotor 5, the stator 6, and the second rotor 7 are arranged within the pulley 9A, so that it is possible to further downsize the accessory drive system 1.

Next, a second variation of the above-described embodiment will be described with reference to FIG. 10. As shown in the figure, in the second variation, a power transmission drive system 2B is mainly distinguished from the power transmission drive system 2 in that it is directly connected to an accessory 23 without using a pulley or a belt. The accessory 23 is an oil pump, for example. More specifically, the fixing portion 5b of the first rotor 5 is directly connected to an input shaft 23a of the accessory 23 by a hollow cylindrical connecting portion 5i. The input shaft 23a is formed to be hollow, and is rotatably supported by a bearing 3f. The crankshaft 21a is concentrically rotatably fitted in the input shaft 23a.

With the above arrangement, it is possible to obtain the same advantageous effects as provided by the above-described embodiment. Further, compared with the above-described embodiment, since the input and output pulleys 8 and 9, and the belt 10 are omitted, it is possible to still further downsize the accessory drive system 1 and reduce manufacturing costs thereof, accordingly.

Next, a third variation of the above-described embodiment will be described with reference to FIG. 11. In the third variation variation, a power transmission drive system 2C is distinguished from the power transmission drive system 2 only in that the first rotor 5 and the second rotor 7 are connected to the crankshaft 21a and the accessory 22, respectively. Hereinafter, a description will be given of the operation of the power transmission drive system 2C.

First, a description will be given of the operation of the power transmission drive system 2C during stoppage of the engine 21. In this case, the friction of the engine 21 acts on the first rotor 5, that is, the permanent magnets 5a. Since the friction is by far larger than torque required for driving the accessory 22, the permanent magnets 5a are in a substantially unrotatable state. In such a state, the ECU 13 controls the PDU 11 to thereby supply the stator 6 with electric power to generate the first and second rotating magnetic fields, whereby the output shaft 4 integrally formed with the second rotor 7 is rotated to drive the accessory 22.

It should be noted that the operation of the power transmission drive system 2C is described by assuming that similarly to the above-described embodiment, the permanent magnets 5a, the armatures 6a, and the first and second cores 7a and 7b are arranged as shown in FIG. 4, and by replacing the motion of the first and second rotating magnetic fields by physical motions of imaginary permanent magnets VM equivalent thereto. Further, in this case as well, the description will be given assuming that the magnetic pole on the left-side portion of the imaginary magnet VM (on the first magnetic pole side), and the magnetic pole on the right-side portion of the imaginary magnet VM (on the second magnetic pole side) are regarded as the first and second armature magnetic poles, respectively, and that the rotating magnetic fields generated between the left-side portion of the imaginary magnet VM and the left portion of the first rotor 5 (on the first magnetic pole side), and between the right-side portion of the imaginary magnet VM and the right portion of the first rotor 5 (on the second magnetic pole side) are regarded as the first and second rotating magnetic fields. Furthermore, hereinafter, the left portion and the right portion of the permanent magnet 5a are referred to as "the first magnet portion" and "the second magnet portion".

First, similarly to the above-described embodiment, as shown in FIG. 12(a), the first and second rotating magnetic fields are generated in a manner rotated downward, as viewed in the figure, from a state in which each first core 7a is opposed to each first magnet portion, and each second core 7b is in a position between each adjacent two of the second magnet portions. At the start of the generation of the first and second rotating magnetic fields, the polarity of each first armature magnetic pole is made different from the polarity of an opposed one of the first magnetic poles, and the polarity of each second armature magnetic pole is made the same as the polarity of an opposed one of the second magnetic poles. In this state, magnetic circuits as shown in FIG. 7(a) are formed.

When the imaginary magnets VM rotates from a position shown in FIG. 12(a) to a position shown in FIG. 12(b), the second magnetic lines G2 are generated such that they each connect between the second armature magnetic pole, the second core 7b, and the second magnetic pole, and the first magnetic lines G1 between the first cores 7a and the first armature magnetic poles are bent, As a result, magnetic circuits are formed by the first magnetic lines and the second magnetic lines, as shown in FIG. 7(b).

In this state, since the degree of bend of each first magnetic line G1 is small but the total magnetic flux amount thereof is large, a relatively large magnetic force acts on the first core 7a. This causes the first cores 7a to be driven by relatively large driving forces in the direction of rotation of the imaginary magnets VM, that is, the magnetic field rotation direction, whereby the output shaft 4 connected to the first cores 7a rotates in the magnetic field rotation direction. Further, since the degree of bend of the second magnetic line G1 is large but the total magnetic flux amount thereof is small, a relatively small magnetic force acts on the second core 7b. This causes the second cores 7b to be driven by relatively small driving forces in the magnetic field rotation direction, whereby the output shaft 4 connected to the first cores 7a rotates in the magnetic field rotation direction.

Then, when the imaginary magnets VM rotate from the position shown in FIG. 12(b) to respective positions shown in FIGS. 12(c) and 12(d), and FIGS. 13(a) and 13(b), in the mentioned order, the first and second cores 7a and 7b are driven in the magnetic field rotation direction by magnetic forces caused by the first and second magnetic lines G1 and G2, whereby the output shaft 4 rotates in the magnetic field rotation direction. During the time, the first magnetic lines G1 increase in the degree of bend thereof but decrease in the total magnetic flux amount thereof, whereby the magnetic forces acting on the first cores 7a progressively decrease to progressively reduce the driving forces for driving the first cores 7a in the magnetic field rotation direction. Further, the second magnetic lines G2 decrease in the degree of bend thereof but increase in the total magnetic flux amount thereof, whereby the magnetic forces acting on the second cores 7b progressively increase to progressively increase the driving forces for driving the second cores 7b in the magnetic field rotation direction.

Then, while the imaginary magnets VM rotate from the position shown in FIG. 13(b) to the position shown FIG.

13(c), the second magnetic lines G2 are bent, and the total magnetic flux amounts thereof become close to their maximum, whereby the strongest magnetic forces act on the second cores 7b to maximize the driving forces acting on the second cores 7b. After that, as shown in FIG. 13(c), when the imaginary magnets VM each move to a position opposed to the first and second magnet portions, the respective polarities of the first armature magnetic pole and the first magnetic pole opposed to each other become identical to each other, and the first core 7a is positioned between circumferentially adjacent two pairs of first armature magnetic poles and first magnetic poles, each pair having the same polarity. In this state, since the degree of bend of the first magnetic line is large but the total magnetic flux amount thereof is small, no magnetic force for rotating the first core 7a in the magnetic field rotation direction acts on the first core 7a. Further, second armature magnetic poles and second magnetic poles opposed to each other come to have polarities different from each other.

From this state, when the imaginary magnets VM further rotate, the first and second cores 7a and 7b are driven in the magnetic field rotation direction by the magnetic forces caused by the first and second magnetic lines G1 and G2, whereby the output shaft 4 rotates in the magnetic field rotation direction. At this time, while the imaginary magnets VM rotate to the position shown FIG. 12(a), inversely to the above, since the first magnetic lines G1 decrease in the degree of bend thereof but increase in the total magnetic flux amount thereof, the magnetic forces acting on the first cores 7a increase to increase the driving forces acing on the first cores 7a. On the other hand, since the second magnetic lines G2 increase in the degree of bend thereof but decrease in the total magnetic flux amount thereof, the magnetic forces acting on the second cores 7b decrease to reduce the driving force acing on the second core 7b.

As described above, the output shaft 4 rotates in the magnetic field rotation direction, while the driving forces acting on the respective first and second core 7a and 7b repeatedly increase and decrease by turns in accordance with the rotations of the imaginary magnets VM, that is, the rotations of the first and second rotating magnetic fields. In this case, the relationship between the driving forces TRQ7a and TRQ7b acting on the respective first and second cores 7a and 7b (hereinafter referred to as "the first driving forces" and "the second driving forces", respectively), and the torque TRQ4 of the output shaft 4 (hereinafter referred to as "the shaft torque TRQ4") is as shown in FIG. 14.

As shown in the figure, the first and second driving forces TRQ7a and TRQ7b change approximately sinusoidally at the same repetition period, and phases thereof are displaced from each other by a half period. Further, since the output shaft 4 has the first and second core 7a and 7b connected thereto, the shaft torque TRQ4 is equal to the sum of the first and second driving forces TRQ7a and TRQ7b that change as described above, and becomes approximately constant. Furthermore, as described hereinbefore, the driving force of the output shaft 4 is input to the accessory 22 via the input and output pulleys 8 and 9, and the belt 10, whereby the accessory 22 is driven.

Further, in this case, the magnetic forces caused by the first and second magnetic lines G1 and G2 act to rotate the output shaft 4, with the first and second cores 7a and 7b being held at respective intermediate locations between the first magnetic poles and the first armature magnetic poles and between the second magnetic poles and the second armature magnetic poles. Therefore, the second rotor 7 integrally formed with the output shaft 4 rotates at half the speed of the magnetic field rotational speed VF, and the rotational speed VR2 of the second rotor 7 (hereinafter referred to as "the second rotor rotational speed") and the magnetic field rotational speed VF satisfy the relationship of VR2=VF/2. More specifically, in this case, the relationship between the magnetic field rotational speed VF, the second rotor rotational speed VR2, and the crankshaft rotational speed VC is as shown in FIG. 15(a).

It should be noted that during the rotations of the first and second rotating magnetic fields, the first and second cores 7a and 7b are rotated by the magnetic forces caused by the first and second magnetic lines G1 and G2, and therefore the first and second cores 7a and 7b are rotated in a state slightly delayed relative to the first and second rotating magnetic fields. As a result, during the rotations of the first and second rotating magnetic fields, when the imaginary magnets VM are in a position shown in FIG. 13(c), the first and second cores 7a and 7b are actually in a position slightly shifted in a direction (upward, as viewed in the figure) opposite to the magnetic field rotation direction with respect to the position shown in FIG. 13(c). For convenience, however, the first and second cores 7a and 7b are presented in the position shown in the figure.

Further, in this case, the rotational angle sensor 16 detects a rotational angle position of the second rotor 7, and delivers a signal indicative of the sensed rotational angle position to the ECU 13. The ECU 13 calculates the second rotor rotational speed VR2 based on the rotational angle position of the second rotor 7, and controls the magnetic field rotational speed VF such that the calculated second rotor rotational speed VR2 becomes equal to the predetermined value VREF (see FIG. 15(a)). This holds the rotational speed of the input shaft 22a of the accessory 22 at a predetermined value suitable for the operation of the accessory 22.

Furthermore, also during the operation of the engine 21, the ECU 13 causes electric power to be supplied to the stator 6 to generate the first and second rotating magnetic fields, whereby the magnetic forces caused by the first and second magnetic lines G1 and G2 act on the first and second cores 7a and 7b to thereby rotate the output shaft 4, which, as a result, drives the accessory 22.

Further, similarly to the case of the operation during stoppage of the engine 21, in this case as well, the magnetic forces caused by the first and second magnetic lines G1 and G2 act to rotate the output shaft 4, with the first and second cores 7a and 7b being held at respective intermediate locations between the first magnetic poles and the first armature magnetic poles and between the second magnetic poles and the second armature magnetic poles. Therefore, the second rotor rotational speed VR2 becomes equal to an average value of the sum of the magnetic field rotational speed VF and the crankshaft rotational speed VC.

Therefore, the relationship between the second rotor rotational speed VR2, the magnetic field rotational speed VF, and the crankshaft rotational speed VC during operation of the engine 21 can be expressed by the following equation (2):

$$VR2=(VF+VC)/2 \qquad (2)$$

Similarly to the above-described case of the operation during stoppage of the engine 21, in this case as well, the ECU 13 controls the magnetic field rotational speed VF such that the second rotor rotational speed VR2 becomes equal to the predetermined value VREF. As shown in FIGS. 15(b) and 15(c), this causes the rotor rotational speed VR to be controlled to the predetermined value VREF, and the rotational speed of the input shaft 22a of the accessory 22 to be held at the predetermined value suitable for the operation of the accessory 22, irrespective of the varying crankshaft rotational speed VC.

Further, as shown in FIG. 15(d), when the crankshaft rotational speed VC assumes such a high value as is higher than a value twice as high as the predetermined value VREF, as indicated by a broken line in the figure, the second rotor rotational speed VR2 sometimes exceeds the predetermined value VREF, even if the magnetic field rotational speed VF of the first and second rotating magnetic fields generated by supply of electric power is controlled. On the other hand, in this case as well, the magnetized first and second cores $7a$ and $7b$ rotate relative to the stator 6, and hence it is possible to cause the armatures $6a$ to generate electric power, by controlling the PDU 11 by the ECU 13. Therefore, in the above case, by causing the armatures $6a$ to generate electric power, the first and second rotating magnetic fields are generated in a manner such that they are rotated opposite to the direction of rotation of the crankshaft $21a$, to control the magnetic field rotational speed VF thereof, whereby it is possible control the rotor rotational speed VR to the predetermined value VREF, as indicated by a solid line in FIG. $15(d)$. As described above, during very high rotation of the engine 21, it is possible to drive the accessory 22 while generating electric power.

Further, to stop the accessory 22 during operation of the engine 21, it is only required to reduce the second rotor rotational speed VR2 to a value of 0, and hence as is apparent from the above equation (2), the first and second rotating magnetic fields are controlled such that they are rotated in the reverse direction to and at the same speed as the rotation of the crankshaft $21a$. More specifically, the armatures $6a$ are caused to generate electric power, and at the same time, the absolute value of the magnetic field rotational speed VF is controlled such that it becomes equal to the crankshaft rotational speed VC. This controls the second rotor rotational speed VR2 to a value of 0, whereby the accessory 22 is stopped and approximately 100% of the driving force of the engine 212 input to the power transmission drive system 2 is converted to electric power.

As is apparent from the above description, also in the third variation, it is possible to obtain the same advantageous effects as provided by the above-described embodiment.

It should be noted that the accessory drive system 1 can be used not only for driving the accessory 22 but also as a starter for starting the engine 21. FIG. 16 shows an accessory drive system 30 configured as such. The accessory drive system 30 includes the power transmission drive system 2A of the aforementioned first variation. As shown in the figure, the first rotor 5 is connected to the engine 21 via the first and second connecting portions $5e$ and $5f$, a one-way clutch 24, and the connecting portion $6g$. The one-way clutch 24 is configured such that it permits the rotation of the first rotor 5 only when the first rotor 5 rotates in the same direction as the direction of rotation of the crankshaft $21a$.

With the above arrangement, as shown in FIG. 17, when the first and second rotating magnetic fields are generated such that they rotate in the same direction as the direction of the rotation of the crankshaft $21a$, the aforementioned magnetic forces caused by the first and second magnetic lines G1 and G2 act to rotate the first and second cores $7a$ and $7b$, i.e. the second rotor 7 connected to the crankshaft $21a$ in the same direction as the direction of the rotation of the crankshaft $21a$. Therefore, it is possible to drive the crankshaft $21a$, and hence it is possible to start the engine 21.

It should be noted that also when the power transmission drive system 2C of the third variation is used, it is possible to start the engine 21. In this case, in a state in which the output shaft 4 and the second rotor 7 are inhibited from rotating e.g. by the clutch, the first and second rotating magnetic fields are generated such that they rotate in the direction opposite to the direction of the rotation of the crankshaft $21a$. This makes it possible to cause the crankshaft $21a$ to rotate together with the first rotor 5 by the magnetic forces caused by the first and second magnetic lines G1 and G2, thereby making it possible to start the engine 21.

It should be noted that the present invention is by no means limited to the embodiment described above, but can be practiced in various forms. For example, although in the embodiment, the present invention is applied to the accessories 22 and 23, that is, a compressor and an oil pump of an automotive air conditioner, by way of example, this is not limitative, but of course the present invention can be applied to other various accessories. For example, the present invention can be applied to a fuel pump and a supercharger compressor for an automotive vehicle, or accessories, such as those installed on boats, aircrafts, and the like. Further, although in the present embodiment, the first and second armature rows are formed by a single stator, they may be formed by two separate stators. Furthermore, although in the present embodiment, the first and second magnetic poles are formed by the magnetic poles of a single permanent magnet $5a$, they may be formed separately by the magnetic poles of two permanent magnets, or formed by the magnetic poles of an electromagnet.

Further, although in the present embodiment, the permanent magnets $5a$, the armatures $6a$, the first and second cores $7a$ and $7b$ are arranged at equal intervals, they may be arranged at unequal intervals. Furthermore, although in the present embodiment, the number of the first cores $7a$ is set to the same number as those of the first armature magnetic poles and the first magnetic poles, and the number of the second cores $7b$ to the same number as those of the second armature magnetic poles and the second magnetic poles, the numbers of the first and second cores $7a$ and $7b$ may be set to smaller numbers.

Further, although in the present embodiment, the PDU 11 and the ECU 13 are employed as the control systems for controlling the power transmission drive systems 2 and 2A to 2C, this is not limitative, but an electric circuit and so forth having a microcomputer installed thereon may be employed. Furthermore, although in the present embodiment, the crankshaft rotational speed VC, the rotor rotational speed VR, and the second rotor rotational speed VR2 are calculated based on the results of detections by the crank angle sensor 15 and the rotational angle sensor 16, the detections (calculations) may be performed by other suitable arbitrary detecting means.

Further, although in the present embodiment and the first and second variations, the crank angle position is used as a parameter indicative of the rotational angle position of the second rotor 7, and in the third variation, the same is used as a parameter indicative of the rotational angle position of the first rotor 5, this is not limitative, but it is to be understood that any other arbitrary parameters may be employed insofar as they are indicative of the rotational angle positions of the first and second rotor 5 and 7. For example, the rotational angle positions of the first and second rotor 5 and 7 may be directly detected e.g. by sensors, and the results of the detections may be used. Further, although in the present embodiment, the rotor rotational speed VR or the second rotor rotational speed VR2 is used as a parameter indicative of the rotational speeds of the input shafts $22a$ and $23a$ of the accessories 22 and 23, this is not limitative, but it is to be understood that any other desired parameters may be employed insofar as they are indicative of the rotational speeds of the input shafts $22a$ and $23a$ of the accessories 22 and 23. For example, the rotational speeds of the input shafts $22a$ and $23a$ of the accessories 22 and 23 may be directly detected e.g. by sensors, and the results of the detections may be used. It is to be further understood that various changes and modifications may be made without departing from the spirit and scope thereof.

BRIEF DESCRIPTION OF THE DRAWINGS

FIG. 5 A diagram which is useful in explaining operations of the power transmission drive system during stoppage of the engine.

FIG. 6 A diagram which is useful in explaining operations continued from the FIG. 5 operation.

FIG. 7 A diagram showing magnetic circuits formed during the operation of the power transmission drive system.

FIG. 8 A diagram showing examples of velocity diagrams representative of the relationship between a magnetic field rotational speed VF, a crankshaft rotational speed VC, and a rotor rotational speed VR, in which: (a) shows an example during stoppage of the engine; (b) an example during low rotation of the engine; (c) an example during high rotation of the engine; and (d) an example during very low rotation of the engine.

FIG. 14 A diagram schematically showing the relationship between first driving forces, second driving forces, and a shaft torque.

FIG. 15 A diagram showing examples of velocity diagrams representative of the relationship between the magnetic field rotational speed VF, a second rotor rotational speed VR2, and the crankshaft rotational speed VC, in which: (a) shows an example during stoppage of the engine; (b) an example during low rotation of the engine; (c) an example during high rotation of the engine; and (d) an example during very high rotation of the engine.

Figure 1:
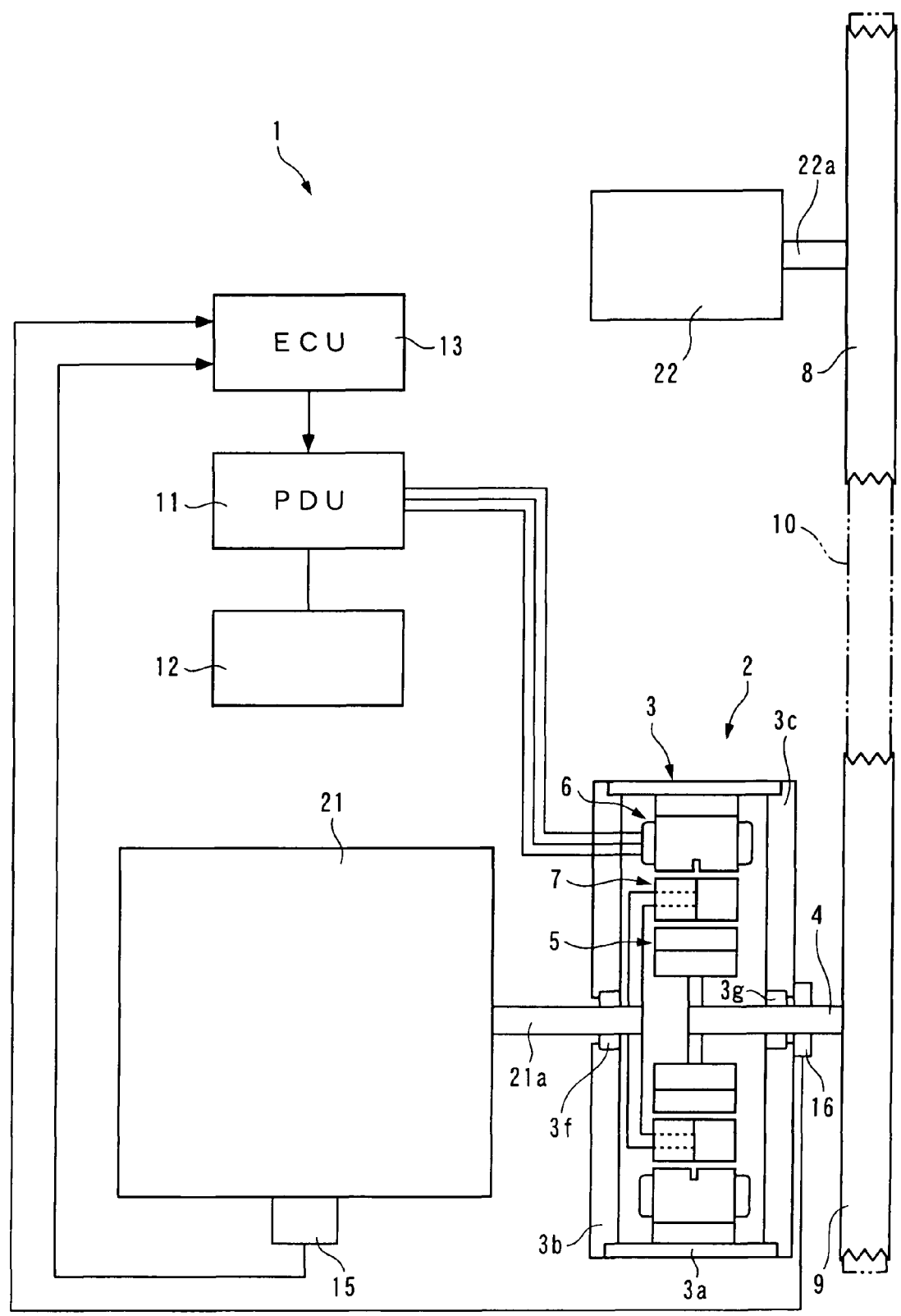
FIG. 1 A diagram schematically showing an accessory drive system according to the present embodiment together with an engine and an accessory.
Figure 2:
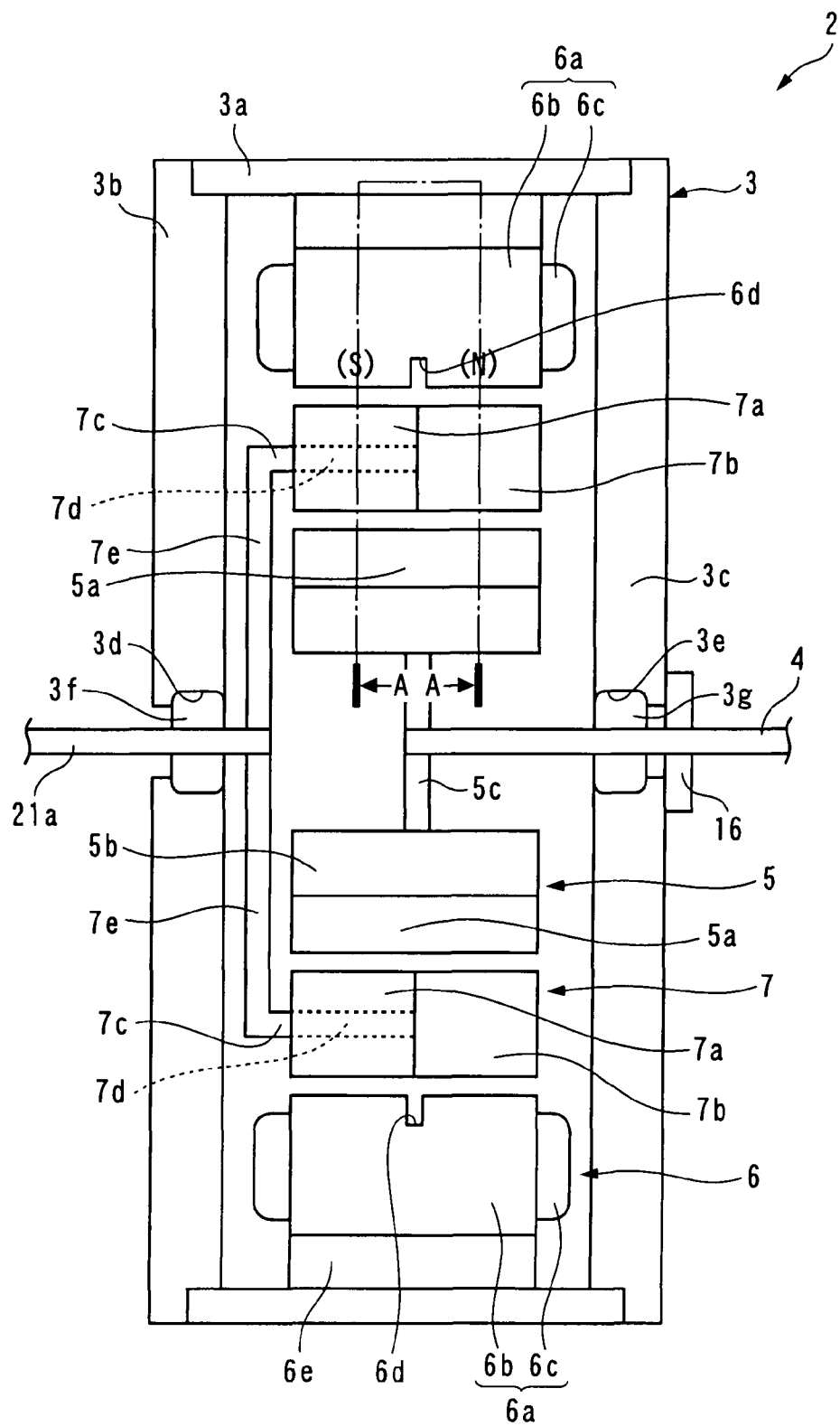
FIG. 2 An enlarged cross-sectional view of the FIG. 1 power transmission drive system.
Figure 3:
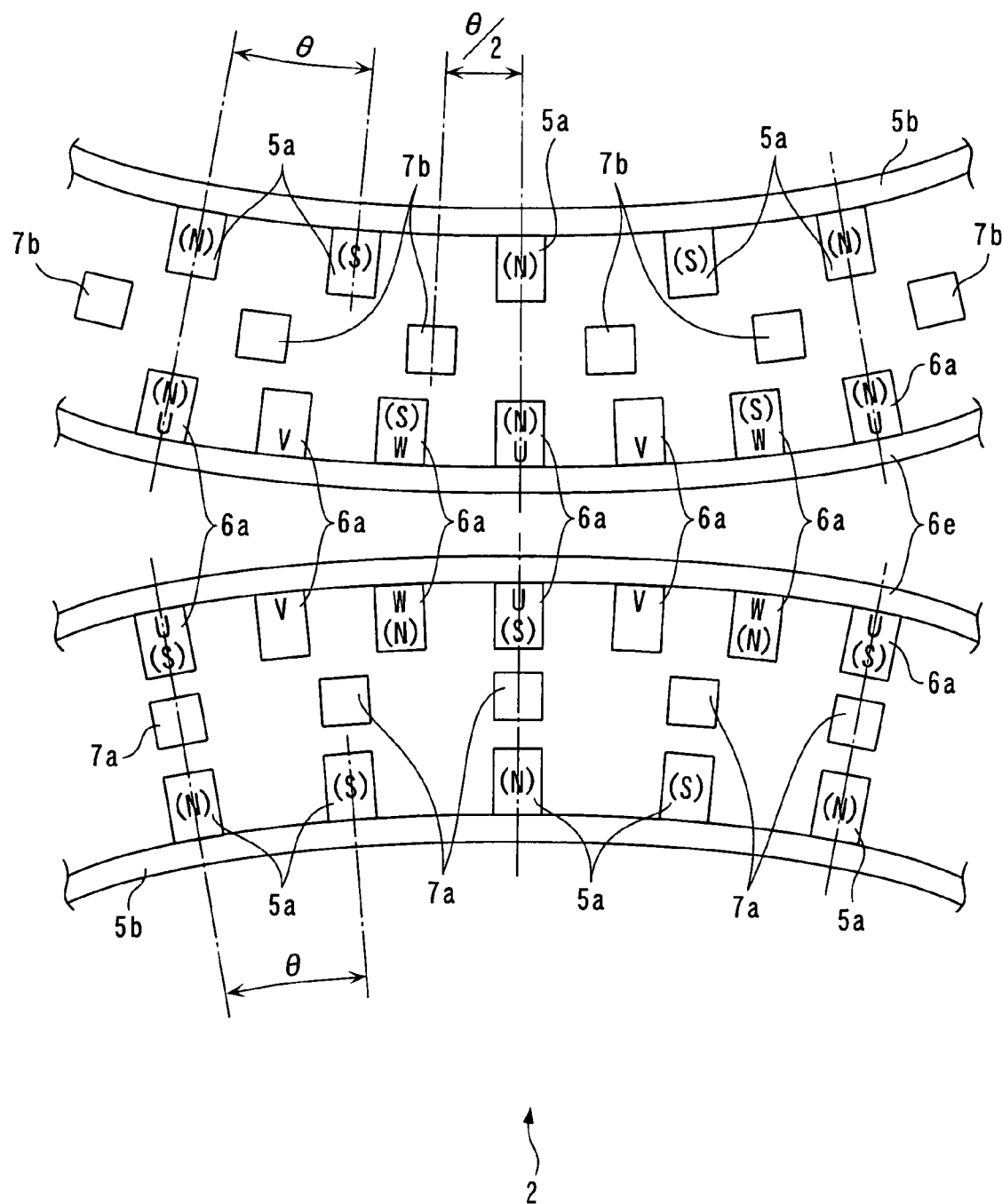
FIG. 3 A development view of part of a cross-section of the FIG. 1 power transmission drive system taken on line A-A of FIG. 2 during generation of first and second rotating magnetic fields.
Figure 4:
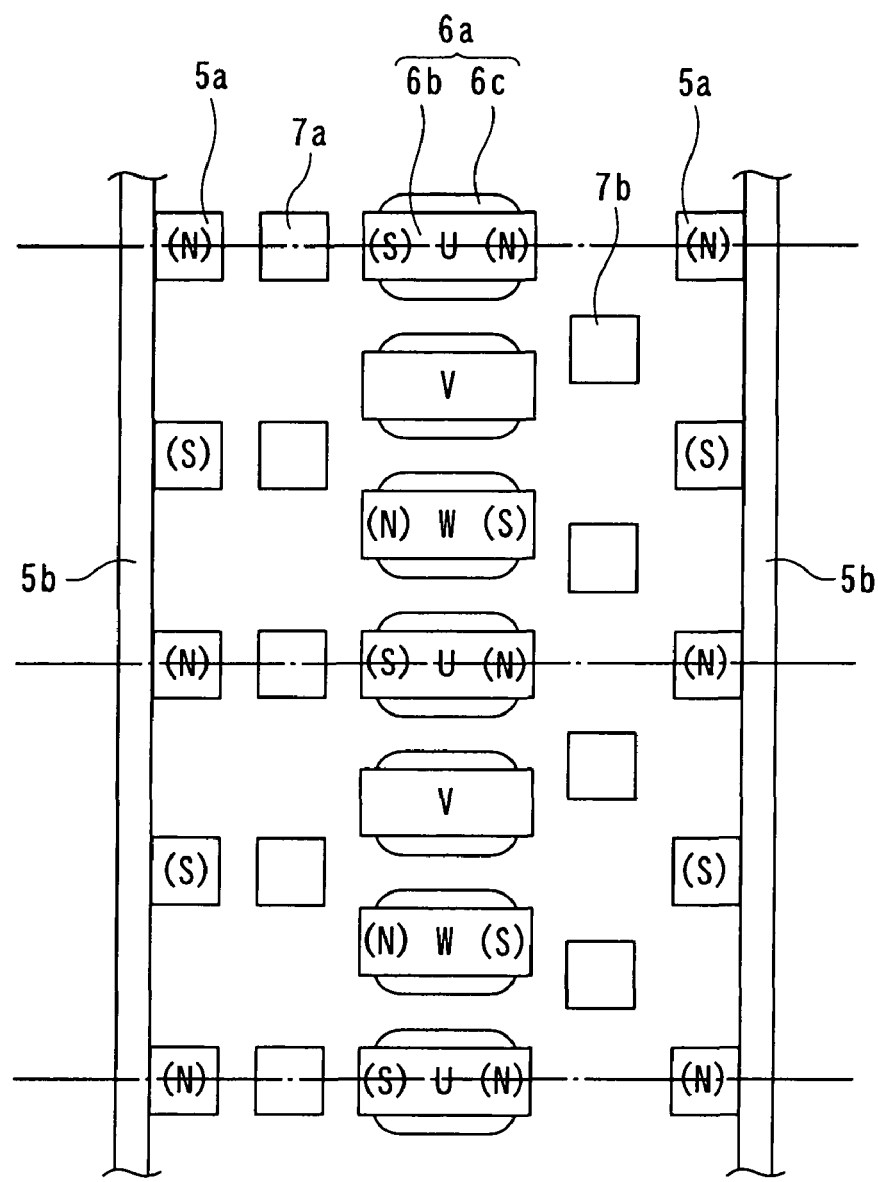
FIG. 4 A diagram showing an arrangement functionally equivalent to the arrangement of the FIG. 3 development view.
Figure 9:
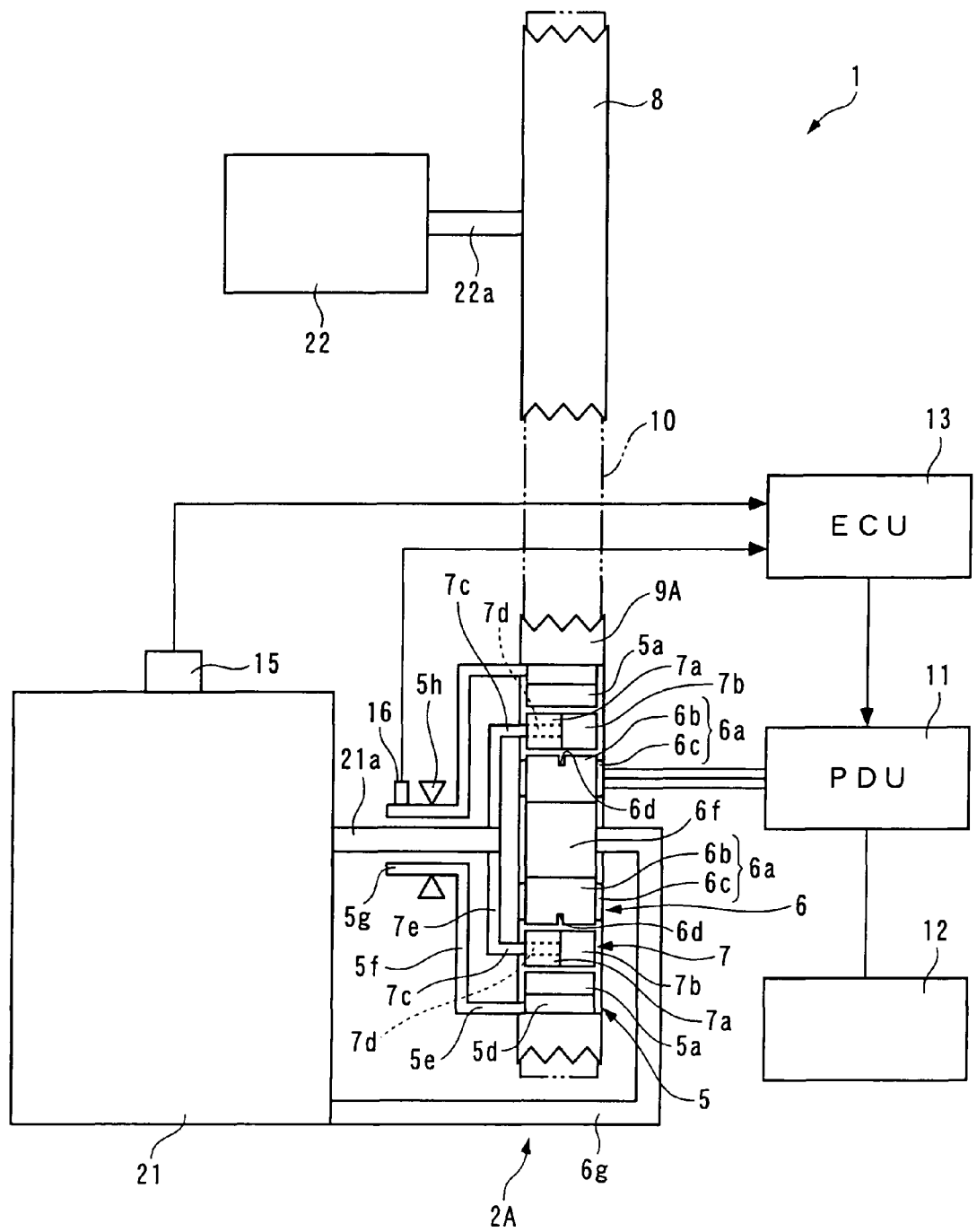
FIG. 9 A diagram schematically showing an accessory drive system according to a first variation together with an engine and an accessory.
Figure 10:
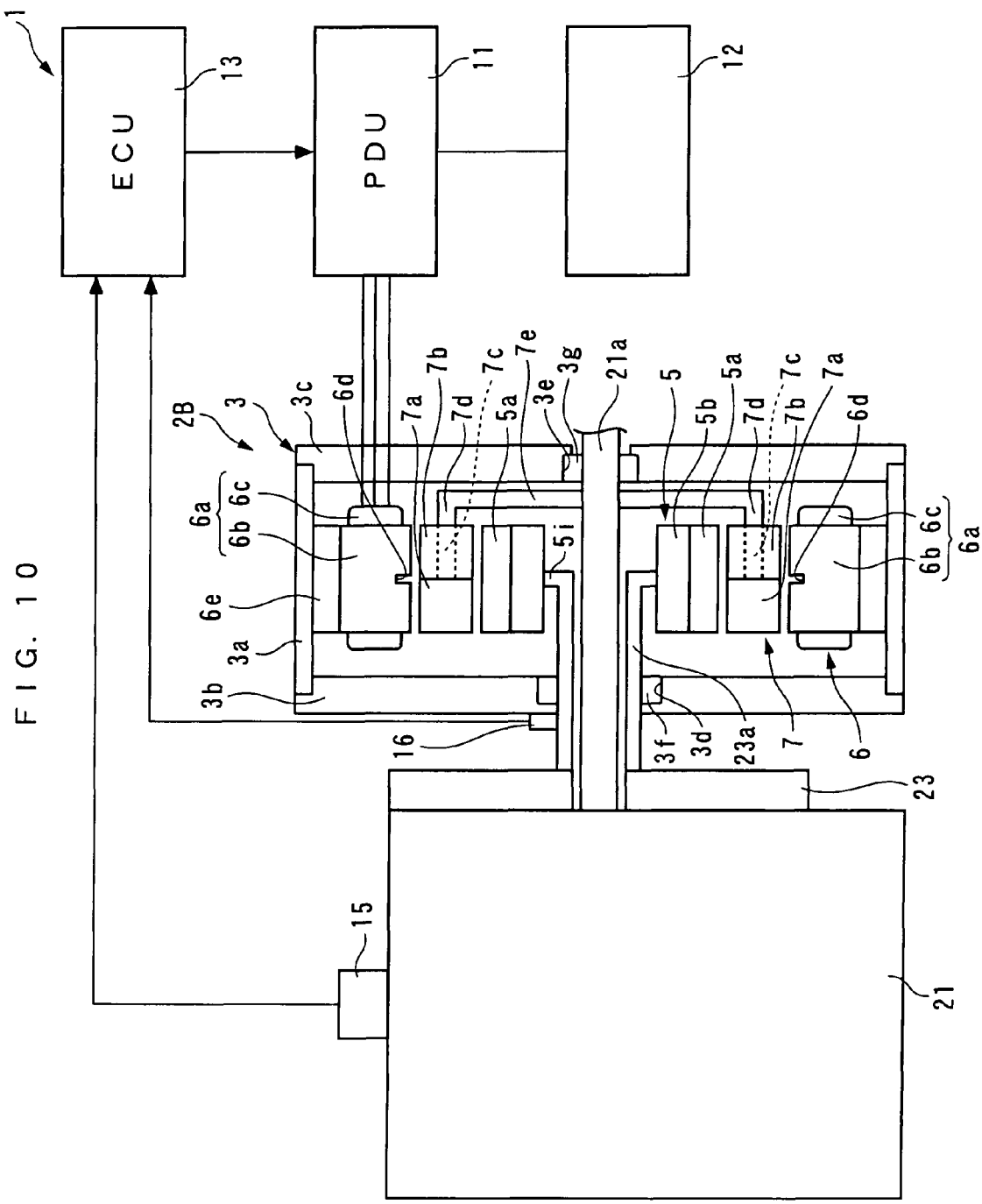
FIG. 10 A diagram schematically showing an accessory drive system according to a second variation together with an engine and an accessory.
Figure 11:
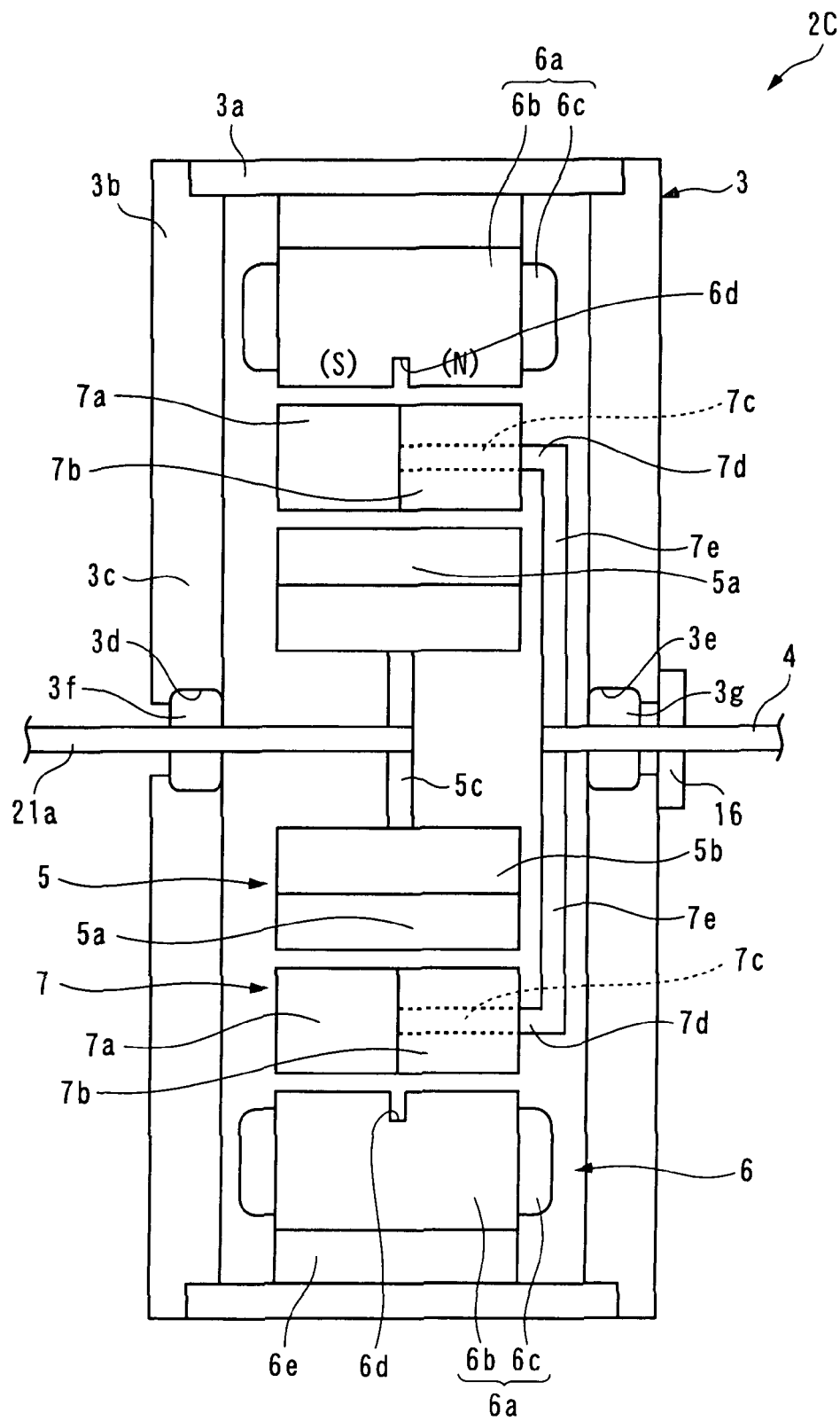
FIG. 11 An enlarged cross-sectional view of a power transmission drive system according to a third variation.
Figure 12:
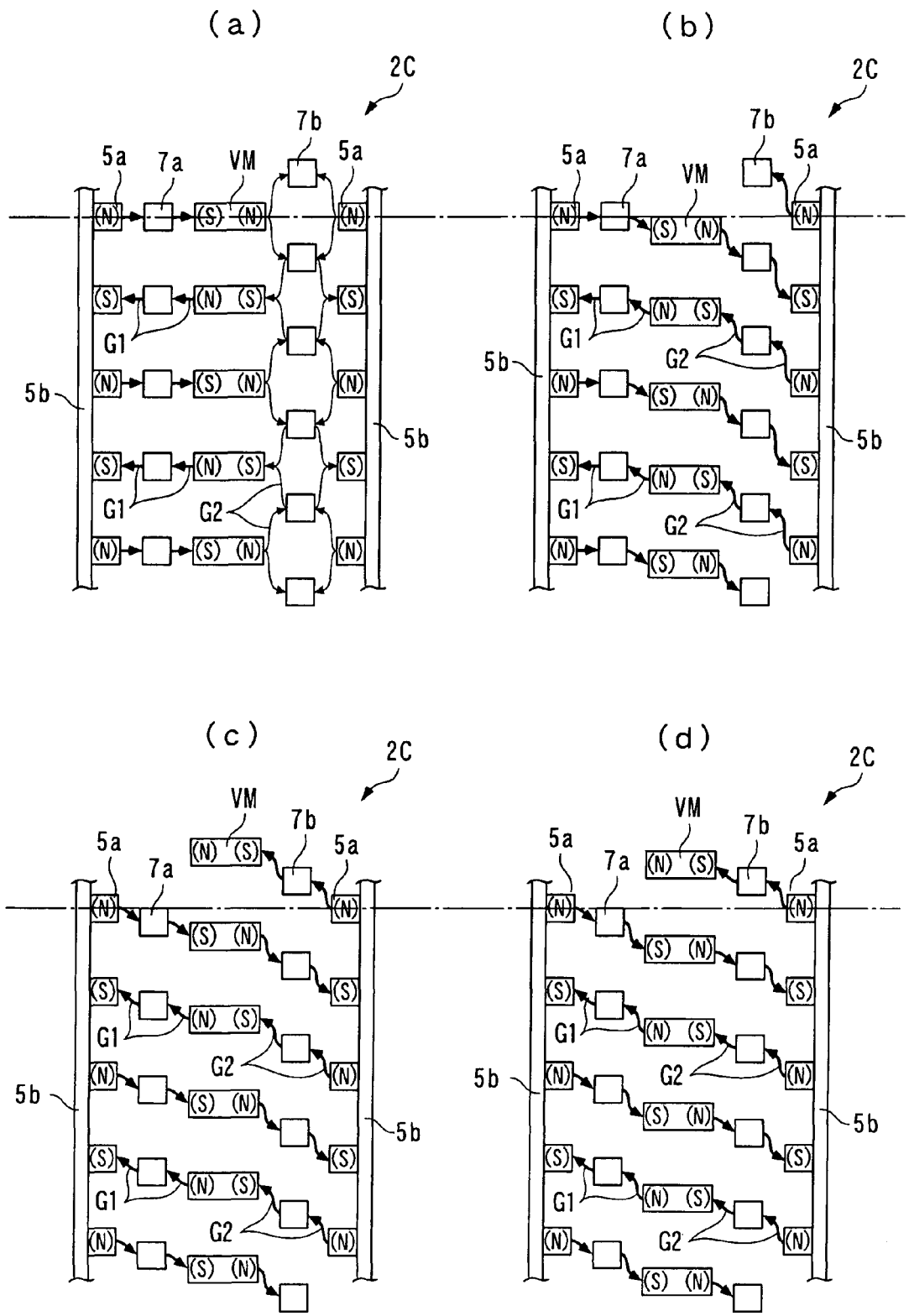
FIG. 12 A diagram which is useful in explaining operations of the FIG. 11 power transmission drive system during stoppage of the engine.
Figure 13:
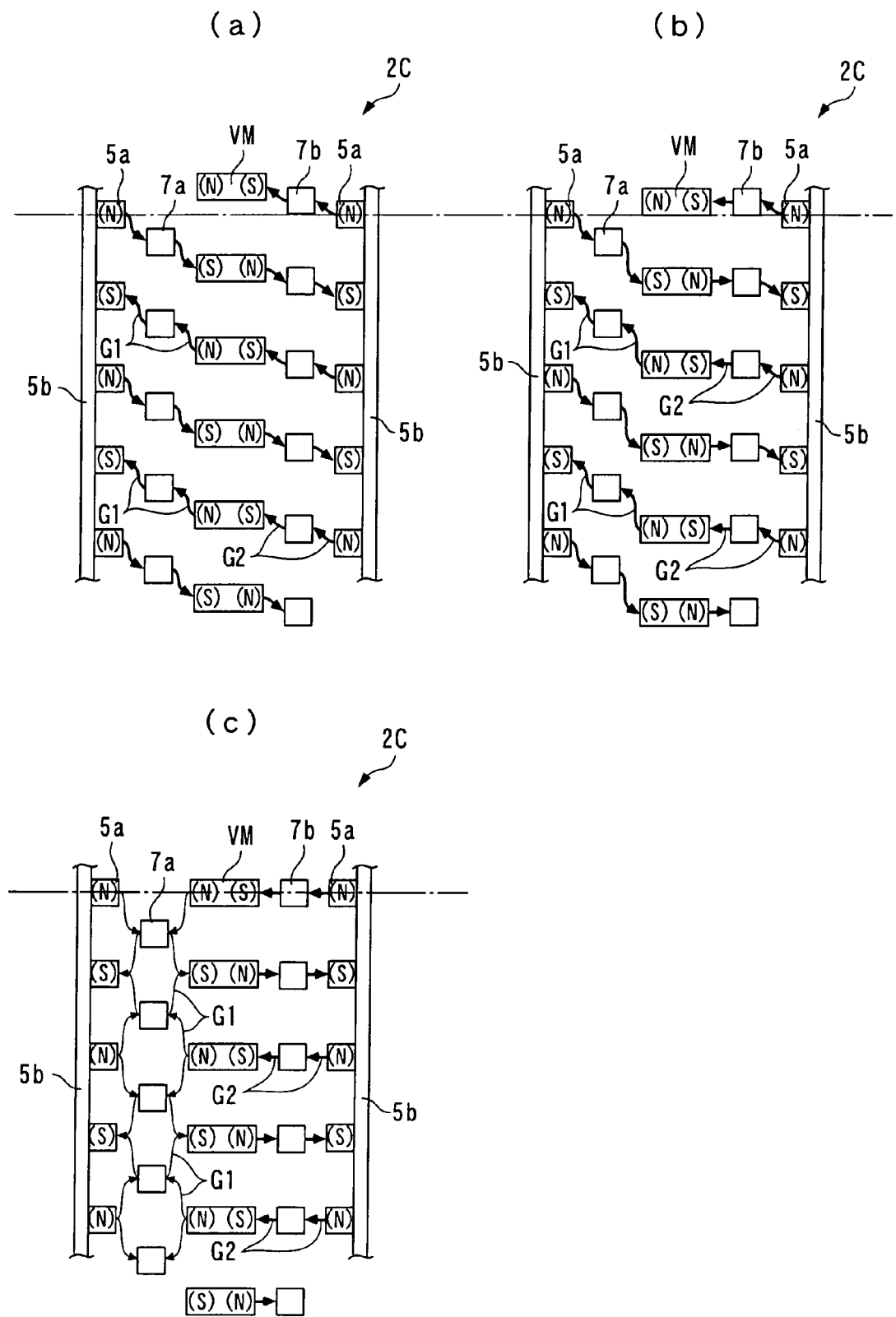
FIG. 13 A diagram which is useful in explaining operations continued from the FIG. 12 operation.
Figure 16:
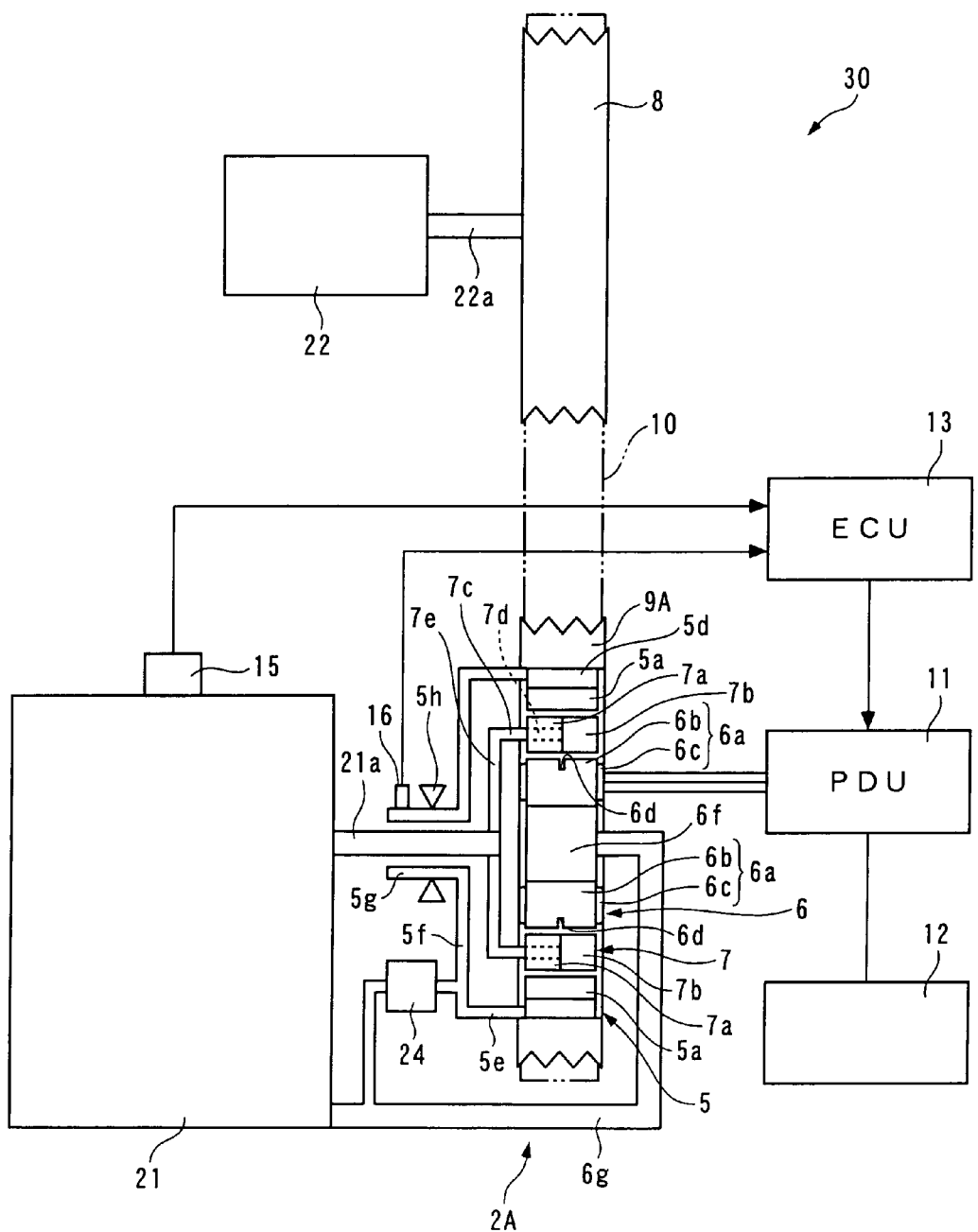
FIG. 16 A diagram schematically showing an accessory drive system used as a starter for starting the engine, together with the engine and the accessory.
Figure 17:
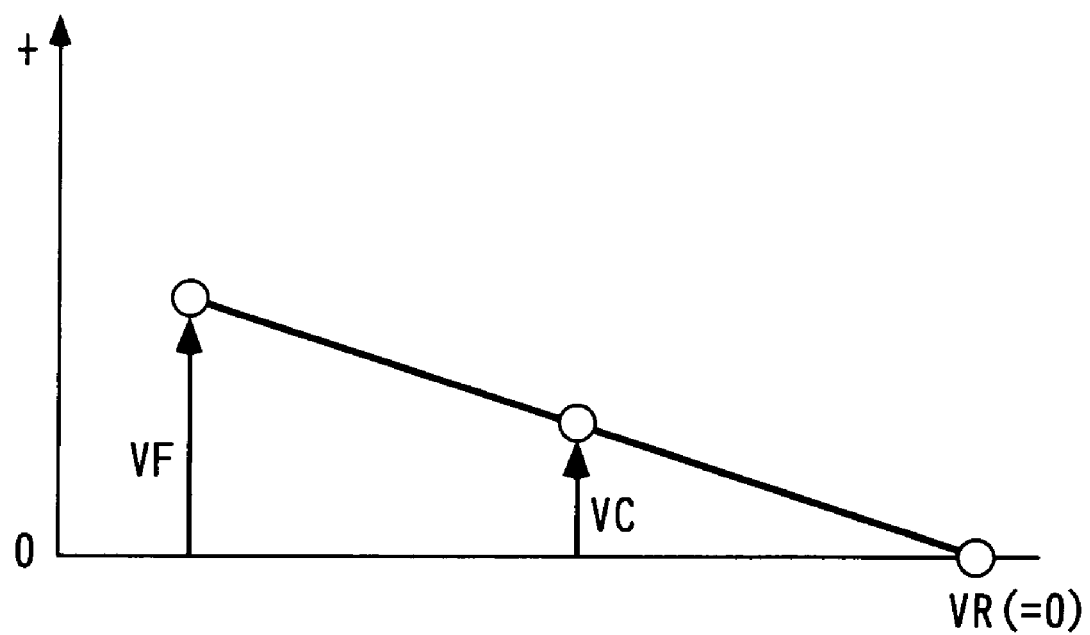
FIG. 17 A diagram showing a velocity diagram representative of the relationship between the magnetic field rotational speed VF, the crankshaft rotational speed VC, and the rotor rotational speed VR of the FIG. 16 accessory drive system during the start of the engine.

DESCRIPTION OF REFERENCE NUMERALS 1 accessory drive system
5 first rotor
5a permanent magnet (first magnetic pole, second magnetic pole)
6 stator
6a armature (first armature, second armature)
7 second rotor
7a first core (first soft magnetic material element)
7b second core (second soft magnetic material element)
21 engine
21a crankshaft (output shaft)
22 accessory
23 accessory

The invention claimed is:

1. An accessory drive system operatively connected to an internal combustion engine for driving an accessory, said accessory drive system, comprising:
    a stator comprising a first armature row comprising a plurality of first armatures configured side by side in a circumferential direction for generating first rotating magnetic fields rotating in a circumferential direction by magnetic poles generated in said plurality of first armatures; and
    a second armature row comprising a plurality of second armatures configured side by side in said circumferential direction for generating second rotating magnetic fields rotating in a same direction as said rotation of said first rotating magnetic fields by magnetic poles generated in said plurality of second armatures, wherein said stator being configured to be immovable;
    a first rotor operatively connected to an output shaft of one of said accessory and said internal combustion engine; and
    a second rotor operatively connected to an output shaft of the other of said accessory and said internal combustion engine.

2. The accessory drive system of claim 1, wherein said first rotor comprises
    a first magnetic pole row comprising a plurality of first magnetic poles configured in said circumferential direction in a manner opposed to said first armature row, wherein two adjacent first magnetic poles comprise polarities different from each other; and
    a second magnetic pole row comprising a plurality of second magnetic poles configured in said circumferential direction in a manner opposed to said second armature row, wherein two adjacent second magnetic poles comprise polarities different from each other.

3. The accessory drive system of claim 1, wherein said second rotor comprises
    a first soft magnetic material element row comprising a plurality of first soft magnetic material elements configured in said circumferential direction at predetermined intervals, said first soft magnetic material element row between said first armature row and a first magnetic pole row; and
    a second soft magnetic material element row comprising a plurality of second soft magnetic material elements configured in said circumferential direction at predetermined intervals, said second soft magnetic material element row between said second armature row and a second magnetic pole row.

4. The accessory drive system of claim 1, wherein when a magnetic pole of a first armature and a magnetic pole are in a first opposed position opposed to each other, a magnetic pole of a second armature and a second magnetic pole are in a second opposed position opposed to each other;
    wherein when said magnetic pole of said first armature and said first magnetic pole in said first opposed position comprise polarities different from each other, said magnetic pole of said second armature and said second magnetic pole in said second opposed position comprise polarities identical to each other; and wherein when said magnetic pole of said first armature and said first magnetic pole in said first opposed position comprise polarities identical to each other, said magnetic pole of said second armature and said second magnetic pole in said second opposed position comprise polarities different from each other.

5. The accessory drive system of claim 1, wherein when a magnetic pole of a first armature and a first magnetic pole are in a first opposed position, if a first soft magnetic material element is between said magnetic pole of said first armature and said first magnetic pole, a second soft magnetic material element is between circumferentially adjacent pairs of magnetic poles of two second armatures and two second magnetic poles; and if said second soft magnetic material element is between a magnetic pole of a second armature and a second magnetic pole, said first soft magnetic material element is between circumferentially adjacent pairs of magnetic poles of two first armatures and two first magnetic poles.

6. The accessory drive system of claim 1, wherein said first armature row and said second armature row comprise a single mutually common armature row.

* * * * *